United States Patent
Meijburg et al.

(10) Patent No.: US 11,854,212 B2
(45) Date of Patent: Dec. 26, 2023

(54) TRAFFIC LIGHT DETECTION SYSTEM FOR VEHICLE

(71) Applicant: Motional AD LLC, Boston, MA (US)

(72) Inventors: Maria Antoinette Meijburg, Boston, MA (US); Paul Schmitt, Merrimack, NH (US); Philipp Robbel, Cambridge, MA (US)

(73) Assignee: Motional AD LLC, Boston, MA (US)

( * ) Notice: Subject to any disclaimer, the term of this patent is extended or adjusted under 35 U.S.C. 154(b) by 285 days.

(21) Appl. No.: 17/088,001

(22) Filed: Nov. 3, 2020

(65) Prior Publication Data

US 2021/0261152 A1  Aug. 26, 2021

Related U.S. Application Data

(60) Provisional application No. 62/981,597, filed on Feb. 26, 2020.

(51) Int. Cl.
*G06T 7/00* (2017.01)
*G06T 7/246* (2017.01)
(Continued)

(52) U.S. Cl.
CPC .......... *G06T 7/246* (2017.01); *B60W 60/001* (2020.02); *G01C 21/3492* (2013.01);
(Continued)

(58) Field of Classification Search
CPC .......... B60W 60/001; B60W 2555/60; B60W 30/18154; B60W 2420/42;
(Continued)

(56) References Cited

U.S. PATENT DOCUMENTS

| | | | |
|---|---|---|---|
| 10,816,993 B1* | 10/2020 | Tran | G05D 1/0088 |
| 2011/0182475 A1* | 7/2011 | Fairfield | G05D 1/0212 |
| | | | 382/104 |

(Continued)

FOREIGN PATENT DOCUMENTS

| | | |
|---|---|---|
| CN | 104411559 | 3/2015 |
| CN | 109035832 | 12/2018 |

(Continued)

OTHER PUBLICATIONS

[No Author Listed], "SAE: International Surface Vehicle Recommended Practice, Taxonomy and Definitions for Terms Related to Driving Automation for On-Road Motor Vehicles," J3016, dated Sep. 30, 2016, 30 pages.

*Primary Examiner* — Tyler J Lee
*Assistant Examiner* — Tiffany P Ohman
(74) *Attorney, Agent, or Firm* — Fish & Richardson P.C.

(57) ABSTRACT

A method for operating a vehicle includes detecting a traffic light located at a first spatiotemporal location based on a first digital video stream captured by a first camera and a second digital video stream captured by a second camera. It is determined that the vehicle is located at a second spatiotemporal location by validating first location data received from sensors against second location data obtained by filtering the first location data. It is determined that the traffic light is expected at the first spatiotemporal location based on a semantic map referenced by the second spatiotemporal location. Responsive to determining that the traffic light is expected at the first spatiotemporal location, a traffic signal of the traffic light is detected based on the two digital video streams. A trajectory is determined in accordance with the traffic signal. A control circuit operates the vehicle in accordance with the trajectory.

18 Claims, 21 Drawing Sheets

(51) Int. Cl.
  *B60W 60/00* (2020.01)
  *H04W 4/44* (2018.01)
  *G08G 1/01* (2006.01)
  *G06T 7/292* (2017.01)
  *G01S 19/42* (2010.01)
  *G01C 21/34* (2006.01)
  *G01C 21/36* (2006.01)
  *H04W 4/80* (2018.01)
  *G06V 20/58* (2022.01)
  *G06F 18/214* (2023.01)
  *B60W 30/18* (2012.01)

(52) U.S. Cl.
  CPC .......... *G01C 21/3691* (2013.01); *G01S 19/42* (2013.01); *G06F 18/214* (2023.01); *G06T 7/292* (2017.01); *G06V 20/584* (2022.01); *G08G 1/0116* (2013.01); *H04W 4/44* (2018.02); *H04W 4/80* (2018.02); *B60W 30/18154* (2013.01); *B60W 2420/42* (2013.01); *B60W 2420/52* (2013.01); *B60W 2555/60* (2020.02); *G06T 2207/10016* (2013.01); *G06T 2207/20081* (2013.01); *G06T 2207/20084* (2013.01); *G06T 2207/30252* (2013.01)

(58) Field of Classification Search
  CPC .............. B60W 2420/52; G06T 7/292; G06T 2207/10016; G06T 2207/20081; G06T 2207/20084; G06T 2207/30252; H04W 4/44; H04W 4/80; G06V 10/56; G06V 20/584; G06V 10/98; G06V 10/22; G01C 21/3492; G01C 21/3691; G01S 19/42; G06K 9/6256; G08G 1/0116

USPC ......................................................... 701/26
See application file for complete search history.

(56) References Cited

U.S. PATENT DOCUMENTS

| | | |
|---|---|---|
| 2015/0124096 A1 | 5/2015 | Koravadi |
| 2016/0318490 A1 | 11/2016 | Shalom |
| 2017/0206427 A1 | 7/2017 | Ginsberg |
| 2017/0301237 A1* | 10/2017 | MacNeille .......... H04W 68/005 |
| 2017/0355375 A1 | 12/2017 | Ferguson et al. |
| 2018/0112997 A1 | 4/2018 | Fasola et al. |
| 2018/0211530 A1 | 7/2018 | Sarkar et al. |
| 2019/0080186 A1 | 3/2019 | Zhai et al. |
| 2019/0180115 A1 | 6/2019 | Zou |
| 2019/0332875 A1 | 10/2019 | Vallespi-Gonzalez et al. |
| 2020/0005632 A1 | 1/2020 | Chen et al. |
| 2020/0031352 A1 | 1/2020 | Takaki et al. |
| 2020/0201331 A1* | 6/2020 | Hortner ................ G05D 1/0094 |
| 2020/0342303 A1* | 10/2020 | Stent ...................... H04N 7/185 |
| 2020/0410263 A1* | 12/2020 | Gao ......................... G01S 17/931 |
| 2021/0009107 A1 | 1/2021 | Ries et al. |
| 2021/0053580 A1* | 2/2021 | Horiguchi ......... B60W 50/0097 |

FOREIGN PATENT DOCUMENTS

| | | |
|---|---|---|
| CN | 109460715 | 3/2019 |
| CN | 109949590 | 6/2019 |
| CN | 110471415 | 11/2019 |
| CN | 110543814 | 12/2019 |
| JP | 2018-173723 | 11/2018 |
| KR | 10-2019-0061395 | 6/2019 |
| WO | WO 2016/012524 | 1/2016 |
| WO | WO 2018/197255 | 11/2018 |

* cited by examiner

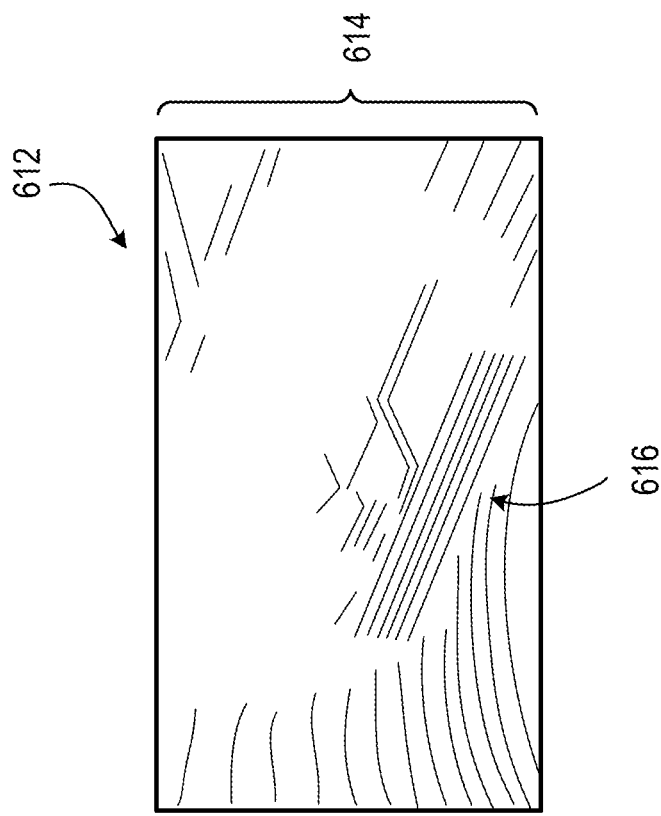
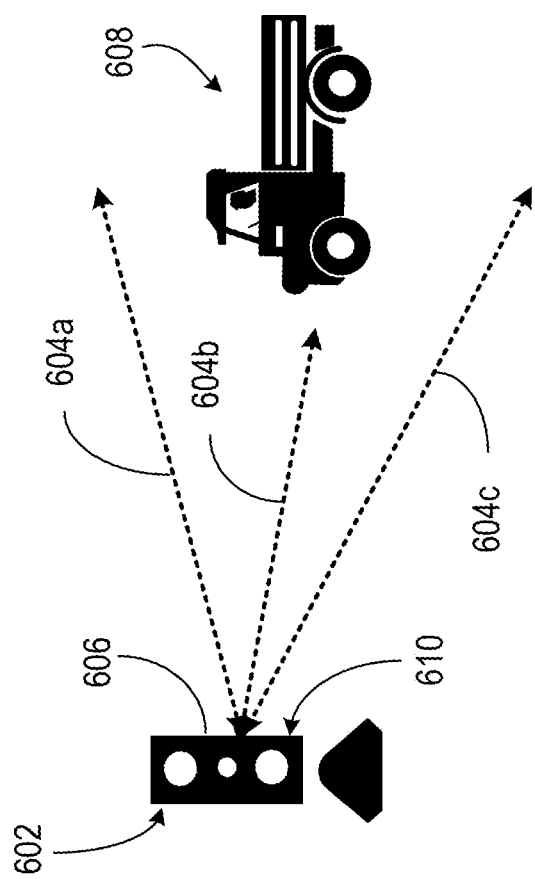
FIG. 6

```
┌─────────────────────────────────────────────────────────────────┐
│ Detect that a traffic signal of a traffic light has transitioned │
│ from a green light to a yellow light based on a digital video    │
│ stream captured by a camera of a vehicle                         │
│ 1704                                                             │
└─────────────────────────────────────────────────────────────────┘
                               ↓
┌─────────────────────────────────────────────────────────────────┐
│ Validate that the traffic signal is a yellow light, based on a   │
│ dedicated short range communications (DSRC) message received by  │
│ a DSRC sensor of the vehicle, the DSRC message transmitted by a  │
│ DSRC transmitter of the traffic light                            │
│ 1708                                                             │
└─────────────────────────────────────────────────────────────────┘
                               ↓
┌─────────────────────────────────────────────────────────────────┐
│ Determine that the traffic signal will transition to a red light │
│ in a particular amount of time based on the digital video stream │
│ 1712                                                             │
└─────────────────────────────────────────────────────────────────┘
                               ↓
┌─────────────────────────────────────────────────────────────────┐
│ Determine that the vehicle is located at a particular distance   │
│ from a stop line of the traffic light based on the digital video │
│ stream                                                           │
│ 1717                                                             │
└─────────────────────────────────────────────────────────────────┘
                               ↓
┌─────────────────────────────────────────────────────────────────┐
│ Determine that the vehicle is able to stop at the stop line      │
│ within the particular amount of time in accordance with a        │
│ comfort profile, the determining that the vehicle is able to     │
│ stop based on the particular amount of time and the particular   │
│ distance from the stop line                                      │
│ 1720                                                             │
└─────────────────────────────────────────────────────────────────┘
                               ↓
┌─────────────────────────────────────────────────────────────────┐
│ Stop the vehicle at the stop line within the particular amount   │
│ of time in accordance with the comfort profile                   │
│ 1724                                                             │
└─────────────────────────────────────────────────────────────────┘
```

FIG. 17

TRAFFIC LIGHT DETECTION SYSTEM FOR VEHICLE

CROSS-REFERENCE TO RELATED APPLICATIONS

This application claims the benefit of U.S. Provisional Application 62/981,597, filed on Feb. 26, 2020, which is incorporated herein by reference in its entirety.

FIELD OF THE INVENTION

This description relates generally to operation of vehicles and specifically to a traffic light detection system for a vehicle.

BACKGROUND

Operation of a vehicle from an initial location to a final destination often requires a user or a vehicle's decision-making system to select a route through a road network from the initial location to a final destination. The route may involve meeting objectives, such as not exceeding a maximum driving time. A complex route can require many decisions, making traditional greedy algorithms for autonomous driving impractical.

SUMMARY

Methods for operating a vehicle include using one or more processors of the vehicle to detect a traffic light that is located at a first spatiotemporal location. The detection is based on a first digital video stream captured by a first camera of the vehicle and a second digital video stream captured by a second camera of the vehicle. The processors also determine that the vehicle is located at a second spatiotemporal location. To determine the second spatiotemporal location, the processors validate first location data generated using multiple sensors of the vehicle against second location data. The second location data is obtained by filtering the first location data using a filter (e.g., a Bayesian filter, a Kalman filter, etc.). The processors determine that the traffic light is expected at the first spatiotemporal location based on a semantic map referenced by the second spatiotemporal location. Responsive to determining that the traffic light is expected at the first spatiotemporal location, the processors detect a traffic signal of the traffic light based on the first digital video stream and the second digital video stream. The processors determine a trajectory of the vehicle in accordance with the traffic signal. A control circuit of the vehicle operates the vehicle in accordance with the determined trajectory.

In another aspect, one or more processors of a vehicle receive sensor data from LiDARs of the vehicle, RADARs of the vehicle, and location data from a global navigation satellite system (GNSS) receivers of the vehicle. A first filter (e.g., a Bayesian filter, a Kalman filter, etc.) is executed by the processors to determine a spatiotemporal location of the vehicle by filtering the location data. The spatiotemporal location is associated with one or more travel lanes. The processors validate the spatiotemporal location of the vehicle against the location data based on modular redundancy of the LiDARs, the RADARs, and the GNSS receivers. The processors receive odometry data from a steering wheel sensor and wheel sensors of the vehicle. A second filter is executed by the processors to determine that the vehicle is operating in a particular travel lane by filtering the odometry data. The processors identify a traffic light corresponding to the particular travel lane based on a digital video stream captured by a camera of the vehicle. A control circuit of the vehicle operates the vehicle in accordance with a traffic signal of the traffic light.

In another aspect, one or more processors of a vehicle detect that a traffic signal of a traffic light has transitioned from a green light to a yellow light based on a digital video stream captured by a camera of the vehicle. The processors validate that the traffic signal has transitioned to the yellow light based on a dedicated short range communications (DSRC) message received by a DSRC sensor of the vehicle. The DSRC message is transmitted by a DSRC transmitter of the traffic light. The processors determine that the traffic signal will transition to a red light in a particular amount of time based on the digital video stream. The processors determine that the vehicle is located at a particular distance from a stop line of the traffic light based on the digital video stream. The processors determine that the vehicle is able to stop at the stop line within the particular amount of time in accordance with a comfort profile. The determination is based on the particular amount of time and the particular distance from the stop line. A control circuit of the vehicle stops the vehicle at the stop line within the particular amount of time in accordance with the comfort profile.

In another aspect, a control circuit of a vehicle operates the vehicle in a particular travel lane in accordance with a trajectory of the vehicle. The trajectory directs the vehicle to turn left at an intersection. One or more processors of the vehicle detect that the vehicle is approaching the intersection. The processors determine a spatiotemporal location of the vehicle based on sensor data received from one or more sensors of the vehicle. The processors determine a distance of the vehicle from the intersection based on a semantic map referenced by the spatiotemporal location. The processors determine that the vehicle can turn left at the intersection from the particular travel lane based on the sensor data. The sensor data includes a digital video stream of lane markings of the particular lane. The processors detect that a traffic signal of a traffic light located at the intersection is either a green left turn arrow or a green light. Responsive to detecting that the traffic signal is a green left turn arrow, the control circuit operates the vehicle, such that the vehicle turns left at the intersection in accordance with the trajectory.

Among others, the benefits and advantages of the embodiments disclosed herein include generating and evaluating different and complex motion segments by an autonomous vehicle to address traffic lights and traffic signals, while reducing operational cost and preventing collisions. The disclosed embodiments increase navigational safety for the vehicle as well as for pedestrians and other vehicles. By automatically predicting locations of traffic lights and identifying transitions of traffic signals, a vehicle can increase passenger comfort, and passenger and pedestrian safety. Moreover, reduced wear and tear on the vehicle, reduced travel time, reduced travel distance, and increased safety for other vehicles on the road network is also achieved.

These and other aspects, features, and implementations can be expressed as methods, apparatus, systems, components, program products, means or steps for performing a function, and in other ways.

These and other aspects, features, and implementations will become apparent from the following descriptions, including the claims.

BRIEF DESCRIPTION OF THE DRAWINGS

FIG. 6 is a block diagram illustrating an example of a LiDAR system, in accordance with one or more embodiments.

FIG. 17 is a flow diagram illustrating a process for operation of the TLD system for a vehicle, in accordance with one or more embodiments.

DETAILED DESCRIPTION

Figure 1:
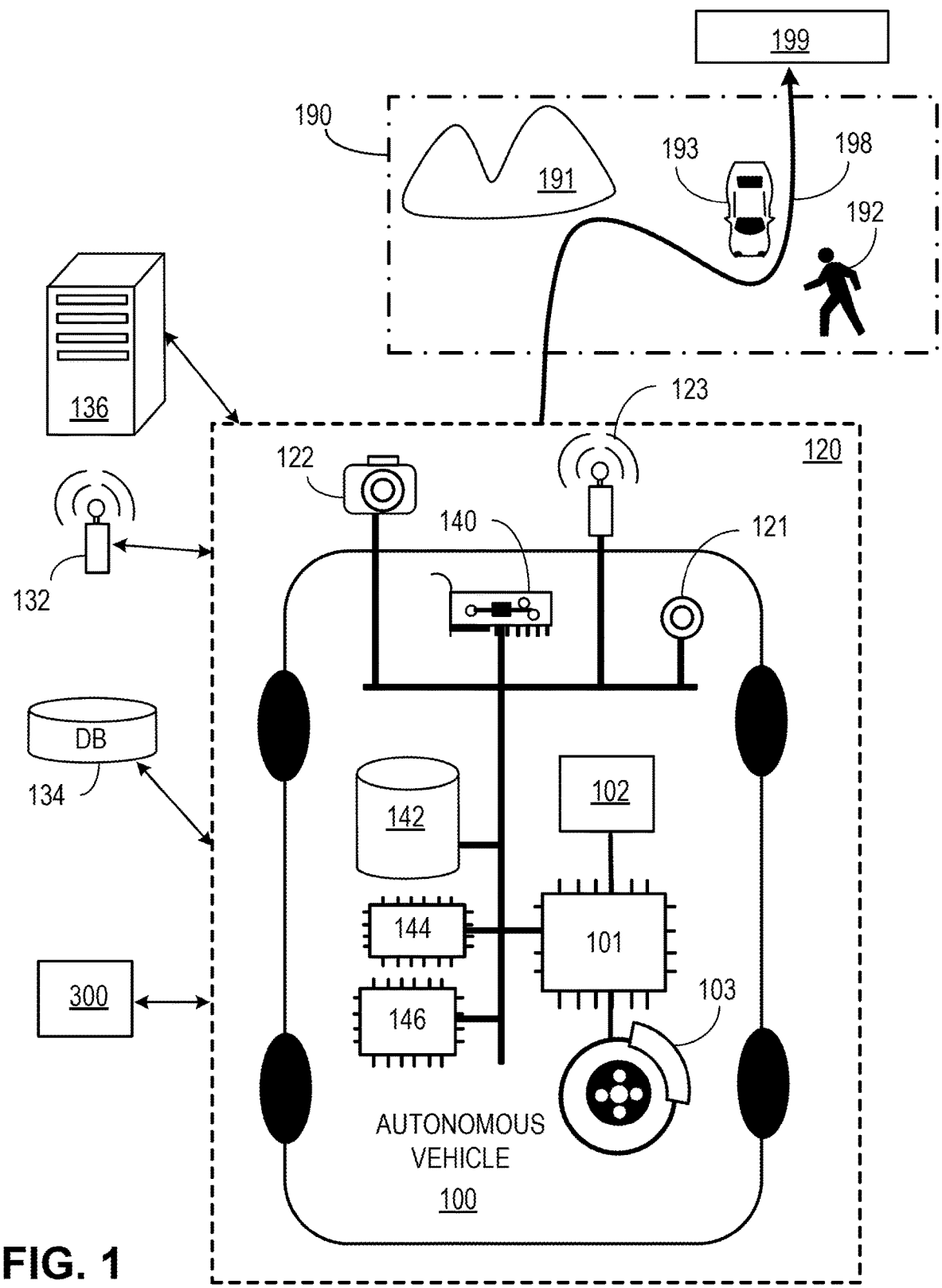
FIG. 1 is a block diagram illustrating an example of an autonomous vehicle (AV) having autonomous capability, in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:
 1. General Overview
 2. System Overview
 3. Autonomous Vehicle Architecture
 4. Autonomous Vehicle Inputs
 5. Autonomous Vehicle Planning
 6. Autonomous Vehicle Control
 7. Architecture of a Traffic Light Detection System
 8. Processes for Operation of a Traffic Light Detection System System Overview FIG. 1 is a block diagram illustrating an example of an autonomous vehicle 100 having autonomous capability, in accordance with one or more embodiments.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to operate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "includes," and/or "including," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear velocity and acceleration, angular velocity and acceleration, and heading (e.g., an orientation of the leading end of AV 100). Example of sensors 121 are GNSS, inertial measurement units (IMU) that measure both vehicle linear accelerations and angular rates, wheel sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Example Cloud Computing Environment

Figure 2:
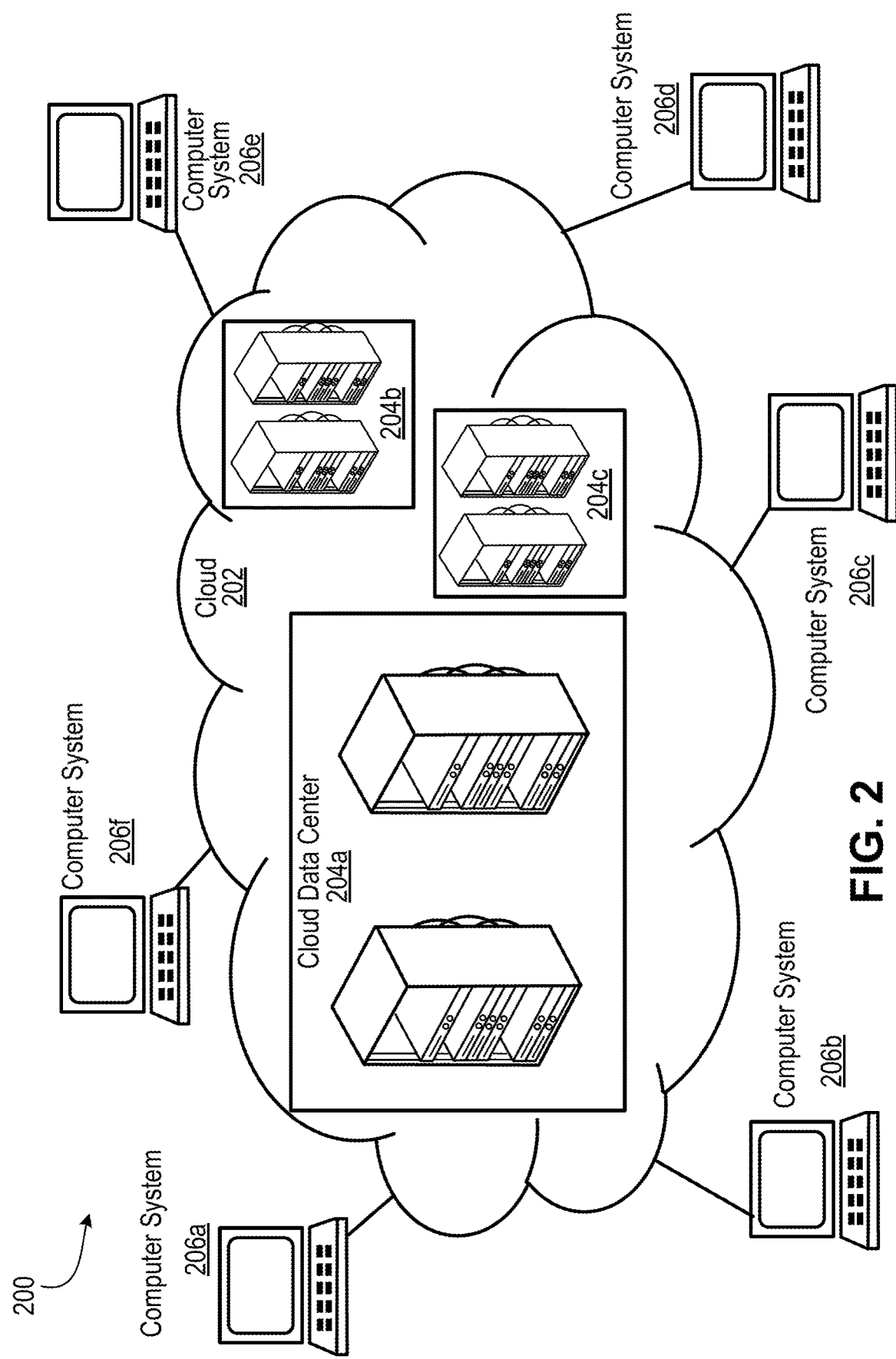
FIG. 2 is a block diagram illustrating an example "cloud" computing environment, in accordance with one or more embodiments.

FIG. 2 is a block diagram illustrating an example "cloud" computing environment, in accordance with one or more embodiments. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Computer System

Figure 3:
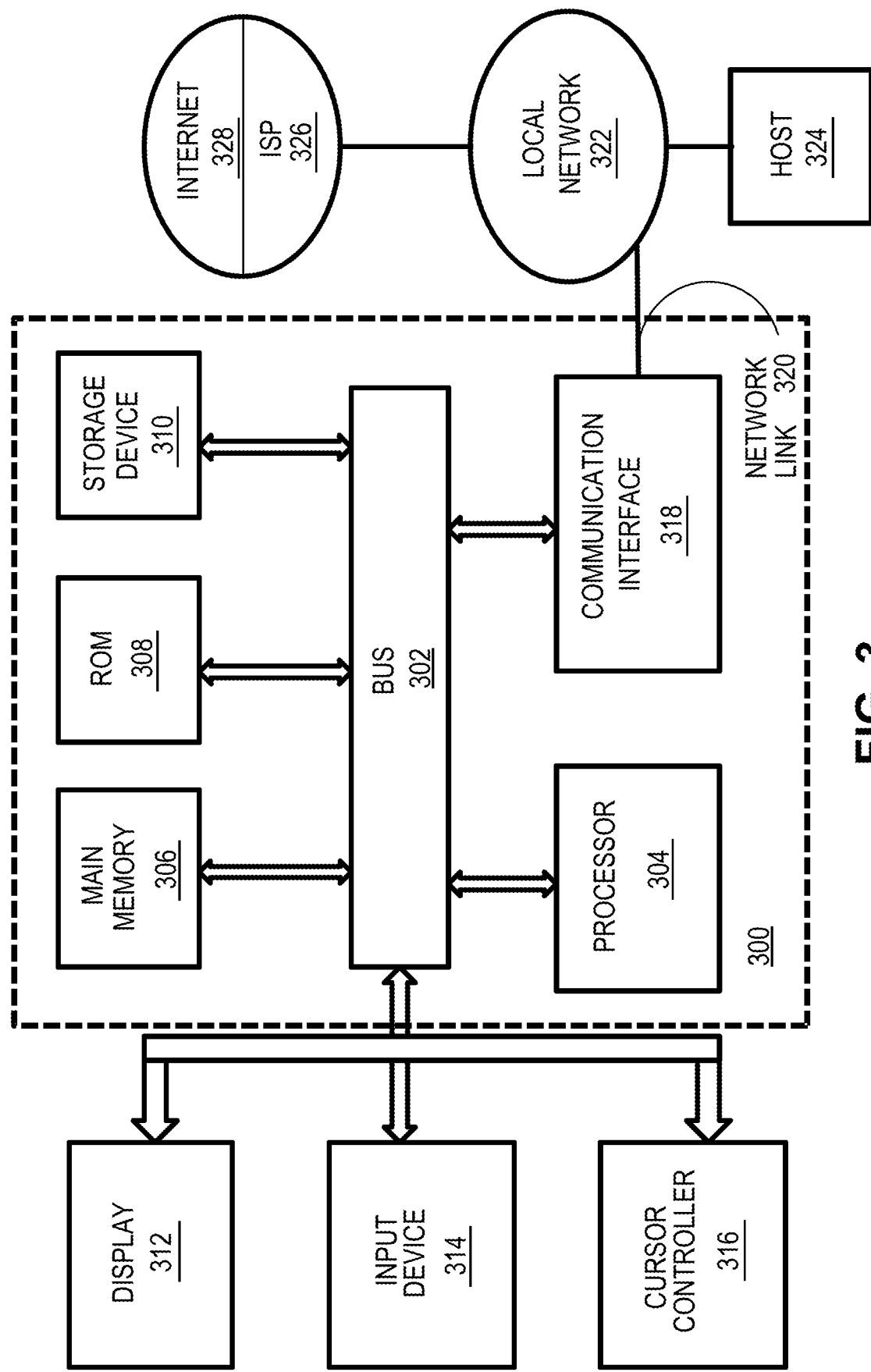
FIG. 3 is a block diagram illustrating a computer system, in accordance with one or more embodiments.

FIG. 3 is a block diagram illustrating a computer system 300, in accordance with one or more embodiments. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that include the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic, or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
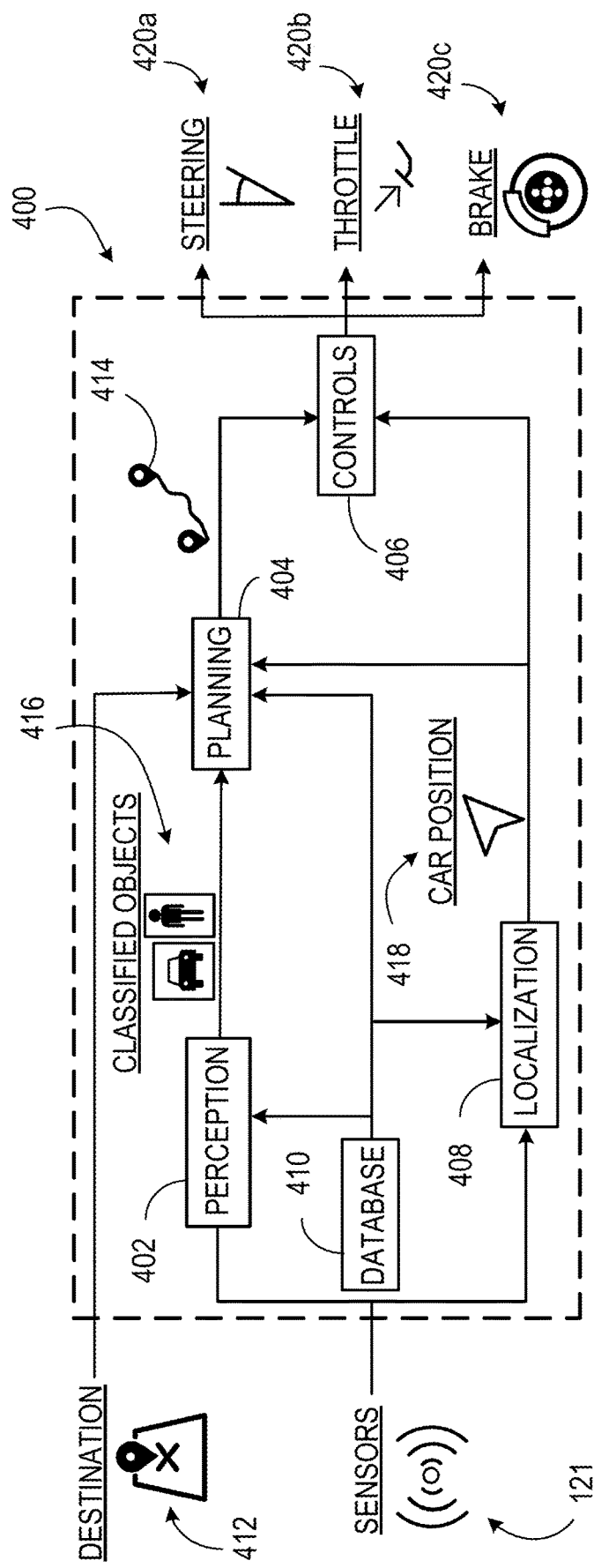
FIG. 4 is a block diagram illustrating an example architecture for an AV, in accordance with one or more embodiments.

FIG. 4 is a block diagram illustrating an example architecture 400 for an autonomous vehicle (e.g., the AV 100 shown in FIG. 1), in accordance with one or more embodiments. The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a global navigation satellite system (GNSS) unit and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
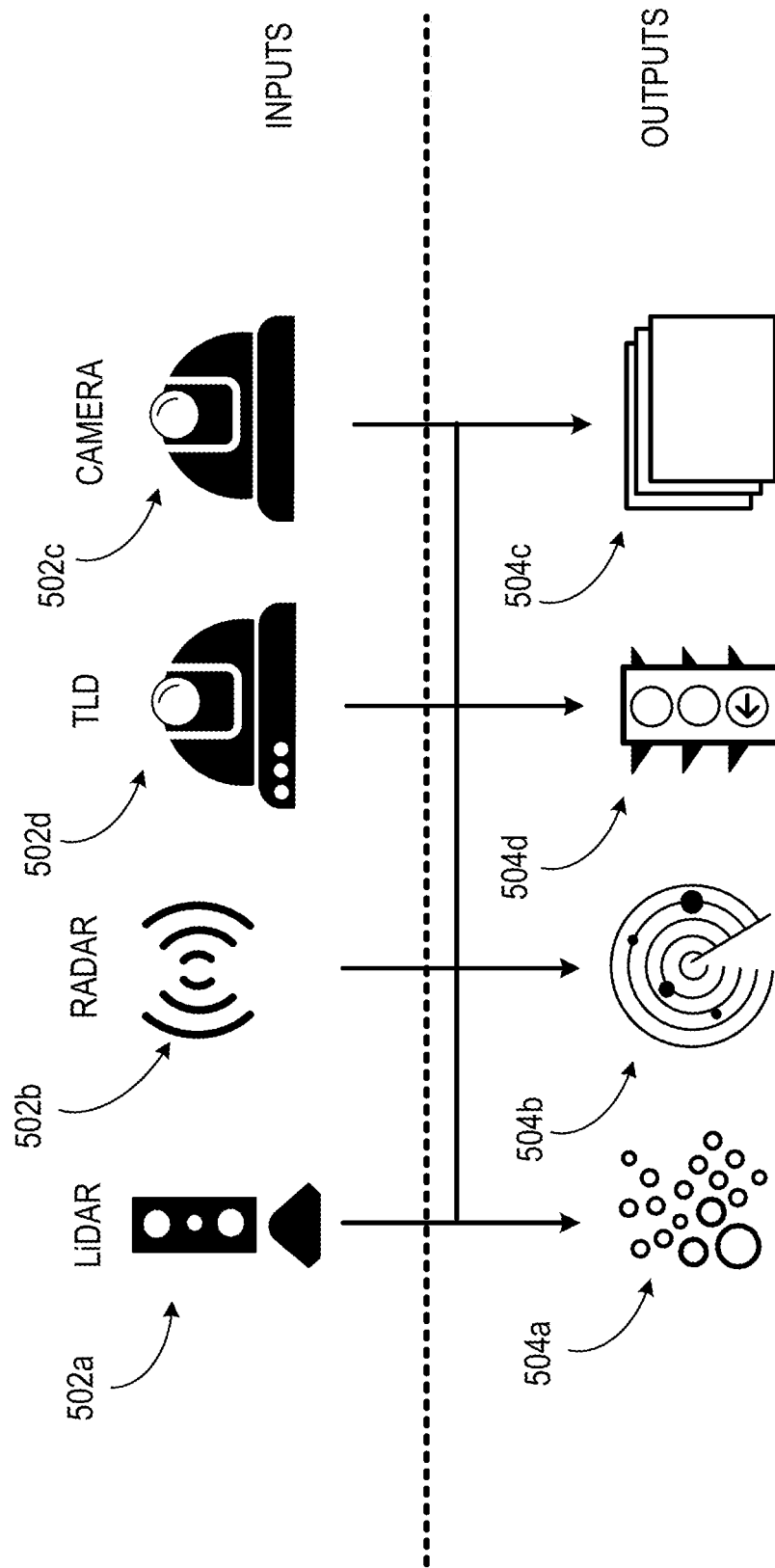
FIG. 5 is a block diagram illustrating an example of inputs and outputs that may be used by a perception module, in accordance with one or more embodiments.

FIG. 5 is a block diagram illustrating an example of inputs 502a-d (e.g., sensors 121 shown in FIG. 1) and outputs 504a-d (e.g., sensor data) that is used by the perception module 402 (FIG. 4), in accordance with one or more embodiments. One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504*a*. For example, LiDAR data is collections of 3D or 2D points (also known as a point clouds) that are used to construct a representation of the environment 190.

Another input 502*b* is a RADAR system. RADAR is a technology that uses radio waves to obtain data about nearby physical objects. RADARs can obtain data about objects not within the line of sight of a LiDAR system. A RADAR system 502*b* produces RADAR data as output 504*b*. For example, RADAR data are one or more radio frequency electromagnetic signals that are used to construct a representation of the environment 190.

Another input 502*c* is a camera system. A camera system uses one or more cameras (e.g., digital cameras using a light sensor such as a charge-coupled device [CCD]) to obtain information about nearby physical objects. A camera system produces camera data as output 504*c*. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502*d* is a traffic light detection (TLD) system. A TLD system uses one or more cameras to obtain information about traffic lights, street signs, and other physical objects that provide visual operation information. A TLD system produces TLD data as output 504*d*. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual operation information as possible, so that the AV 100 has access to all relevant operation information provided by these objects. For example, the viewing angle of the TLD system may be about 120 degrees or more.

In some embodiments, outputs 504*a-d* are combined using a sensor fusion technique. Thus, either the individual outputs 504*a-d* are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

FIG. 6 is a block diagram illustrating an example of a LiDAR system 602 (e.g., the input 502*a* shown in FIG. 5), in accordance with one or more embodiments. The LiDAR system 602 emits light 604*a-c* from a light emitter 606 (e.g., a laser transmitter). Light emitted by a LiDAR system is typically not in the visible spectrum; for example, infrared light is often used. Some of the light 604*b* emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
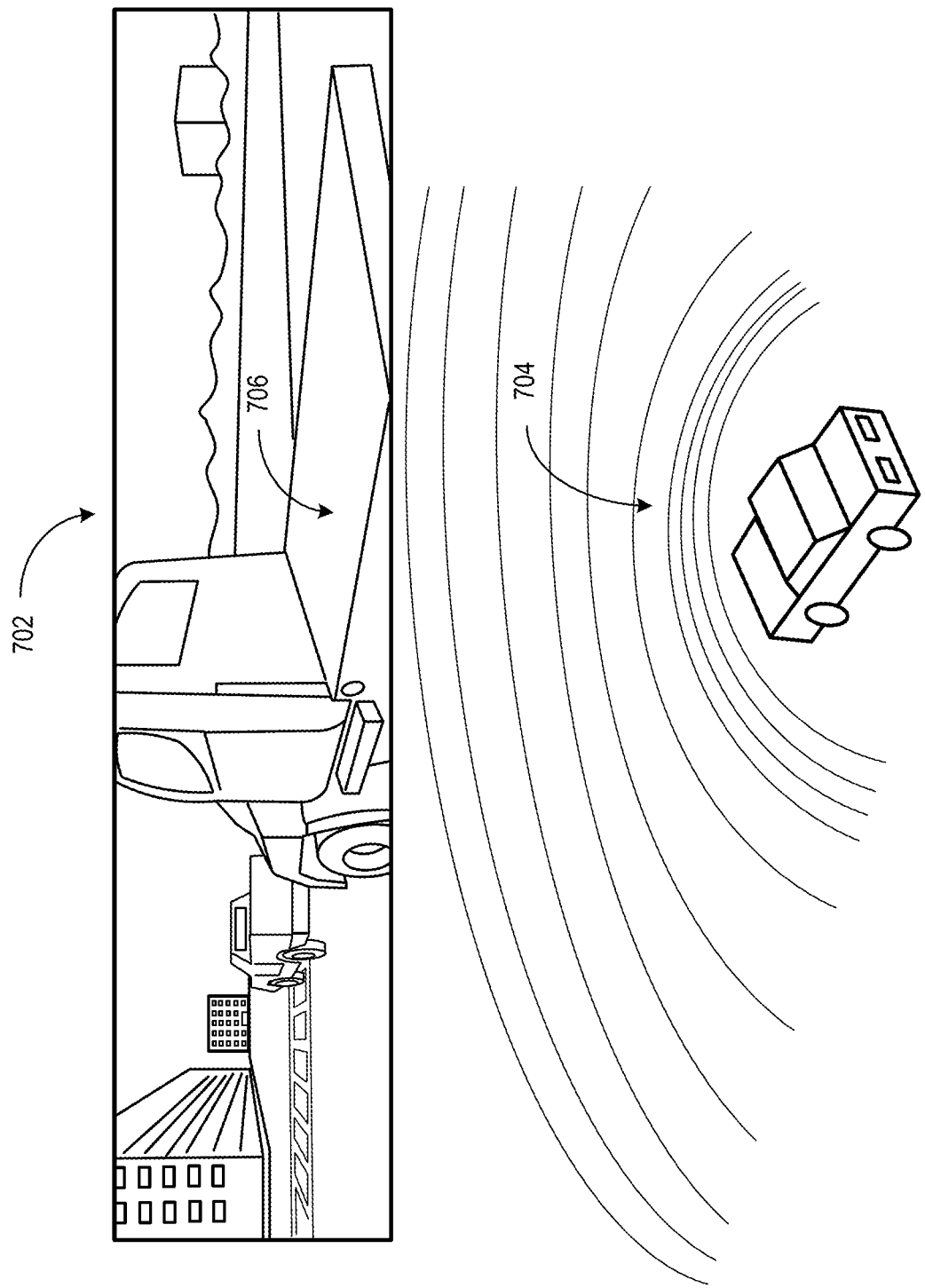
FIG. 7 is a block diagram illustrating the LiDAR system in operation, in accordance with one or more embodiments.

FIG. 7 is a block diagram illustrating the LiDAR system 602 in operation, in accordance with one or more embodiments. In the scenario shown in this figure, the AV 100 receives both camera system output 504*c* in the form of an image 702 and LiDAR system output 504*a* in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
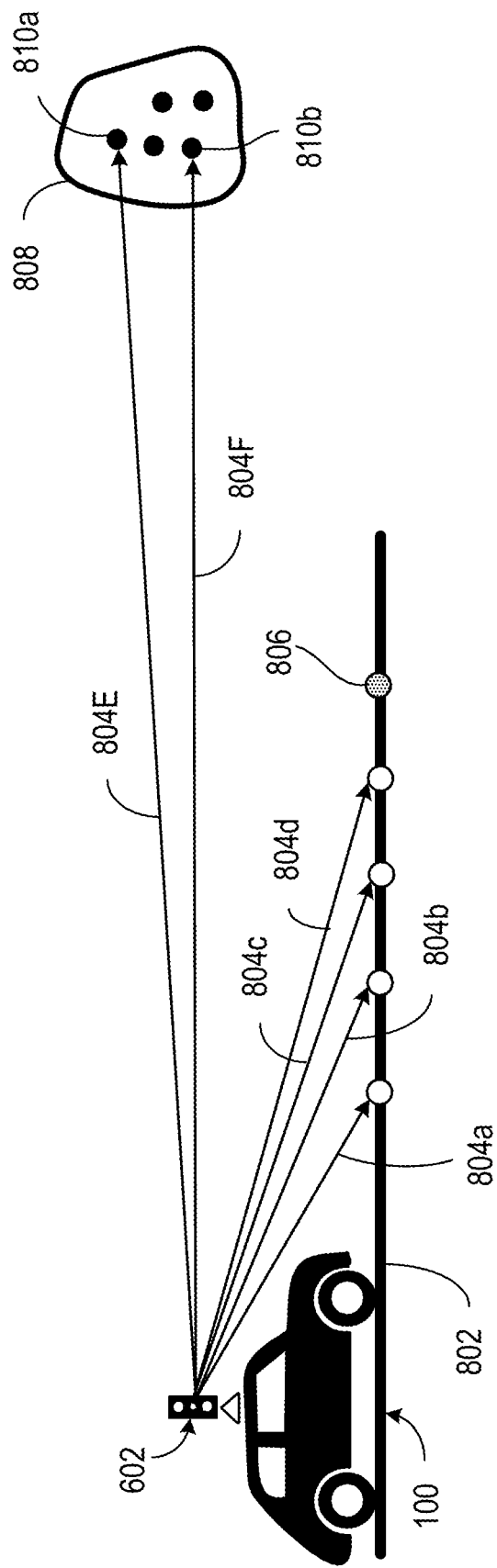
FIG. 8 is a block diagram illustrating the operation of the LiDAR system in additional detail, in accordance with one or more embodiments.

FIG. 8 is a block diagram illustrating the operation of the LiDAR system 602 in additional detail, in accordance with one or more embodiments. As described above, the AV 100 detects the boundary of a physical object based on characteristics of the data points detected by the LiDAR system 602. As shown in FIG. 8, a flat object, such as the ground 802, will reflect light 804*a-d* emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804*e-f* emitted by the LiDAR system 602 will be reflected from points 810*a-b* in a manner inconsistent with the expected consistent manner. From this information, the AV 100 can determine that the object 808 is present.

Path Planning

Figure 9:
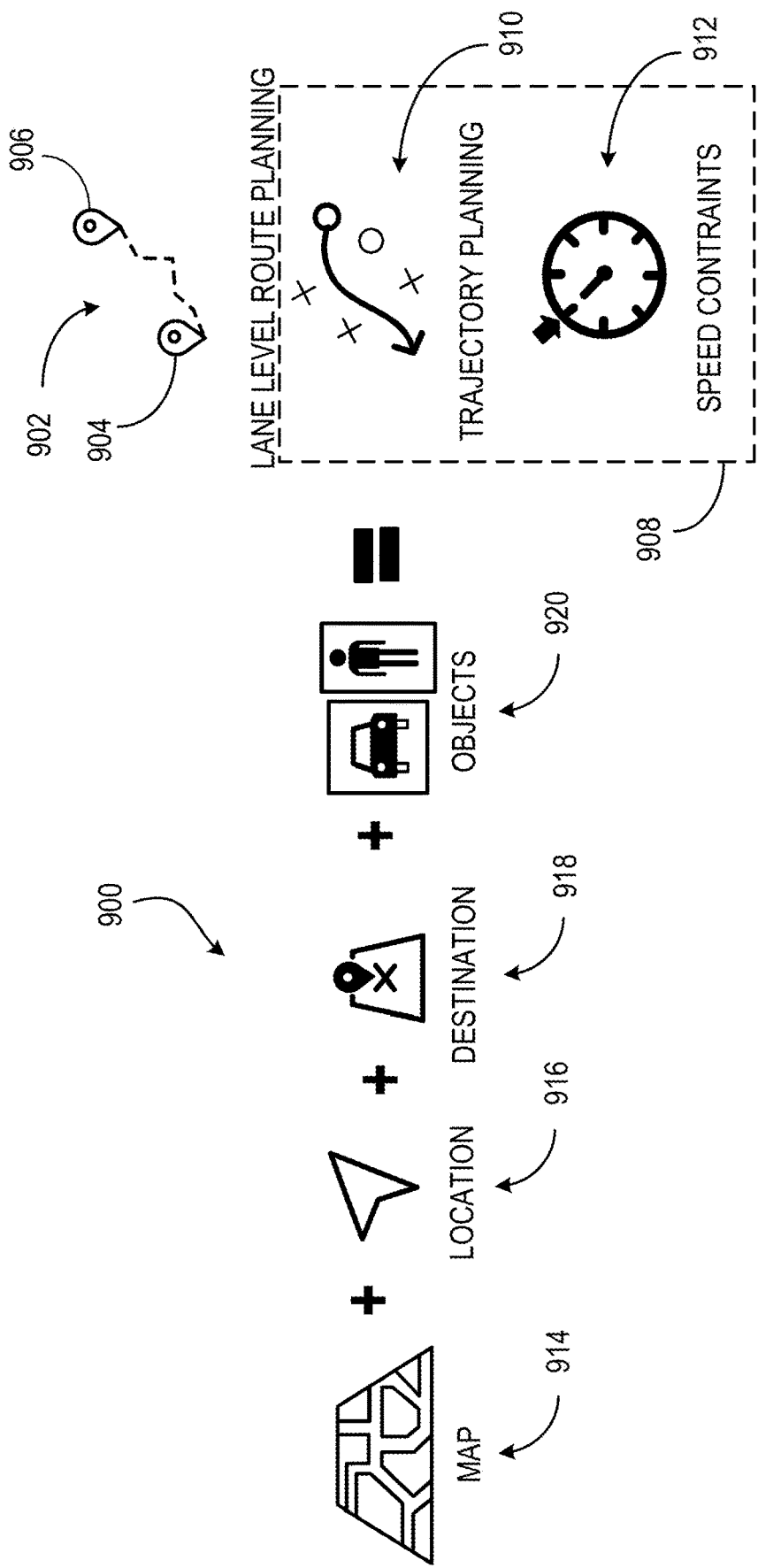
FIG. 9 is a block diagram illustrating the relationships between inputs and outputs of a planning module, in accordance with one or more embodiments.

FIG. 9 is a block diagram 900 illustrating of the relationships between inputs and outputs of a planning module 404 (e.g., as shown in FIG. 4), in accordance with one or more embodiments. In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
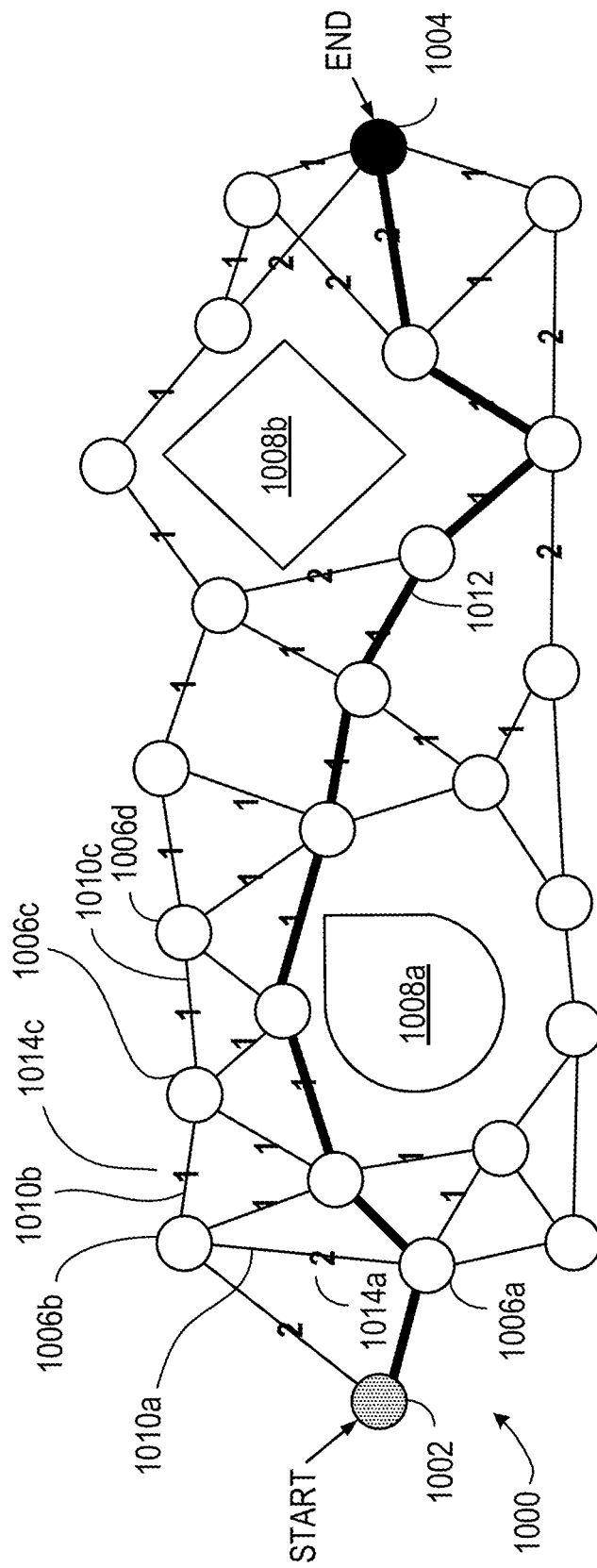
FIG. 10 illustrates a directed graph used in path planning, in accordance with one or more embodiments.

FIG. 10 illustrates a directed graph 1000 used in path planning, e.g., by the planning module 404 (FIG. 4), in accordance with one or more embodiments. In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (When we refer to an AV 100 traveling between nodes, we mean that the AV 100 travels between the two physical positions represented by the respective nodes.) The edges 1010a-c are often bidirectional, in the sense that an AV 100 travels from a first node to a second node, or from the second node to the first node. In an embodiment, edges 1010a-c are unidirectional, in the sense that an AV 100 can travel from a first node to a second node, however the AV 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the AV 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
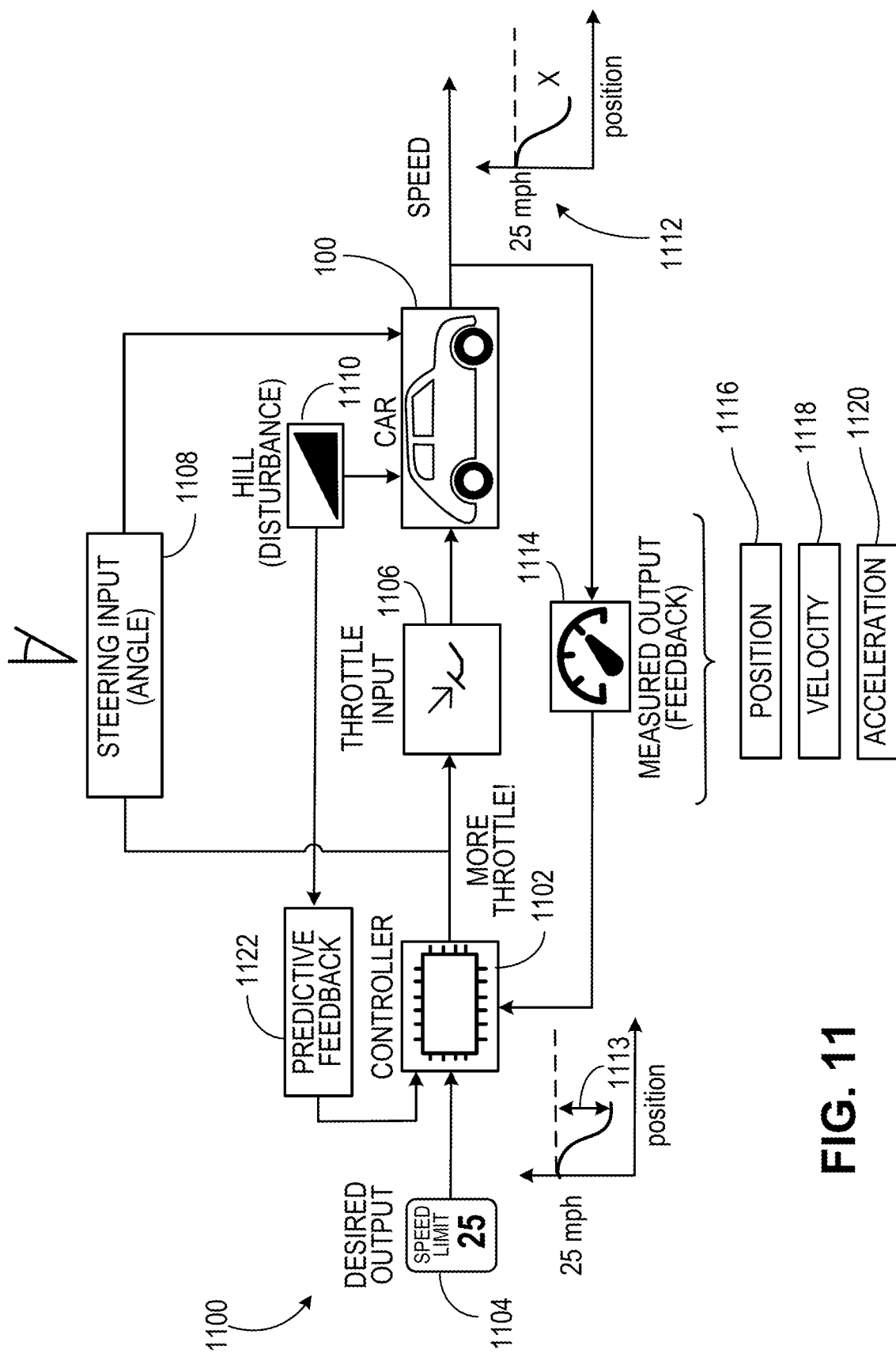
FIG. 11 is a block diagram illustrating the inputs and outputs of a control module, in accordance with one or more embodiments.

FIG. 11 is a block diagram 1100 illustrating the inputs and outputs of a control module 406 (e.g., as shown in FIG. 4), in accordance with one or more embodiments. A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 1308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
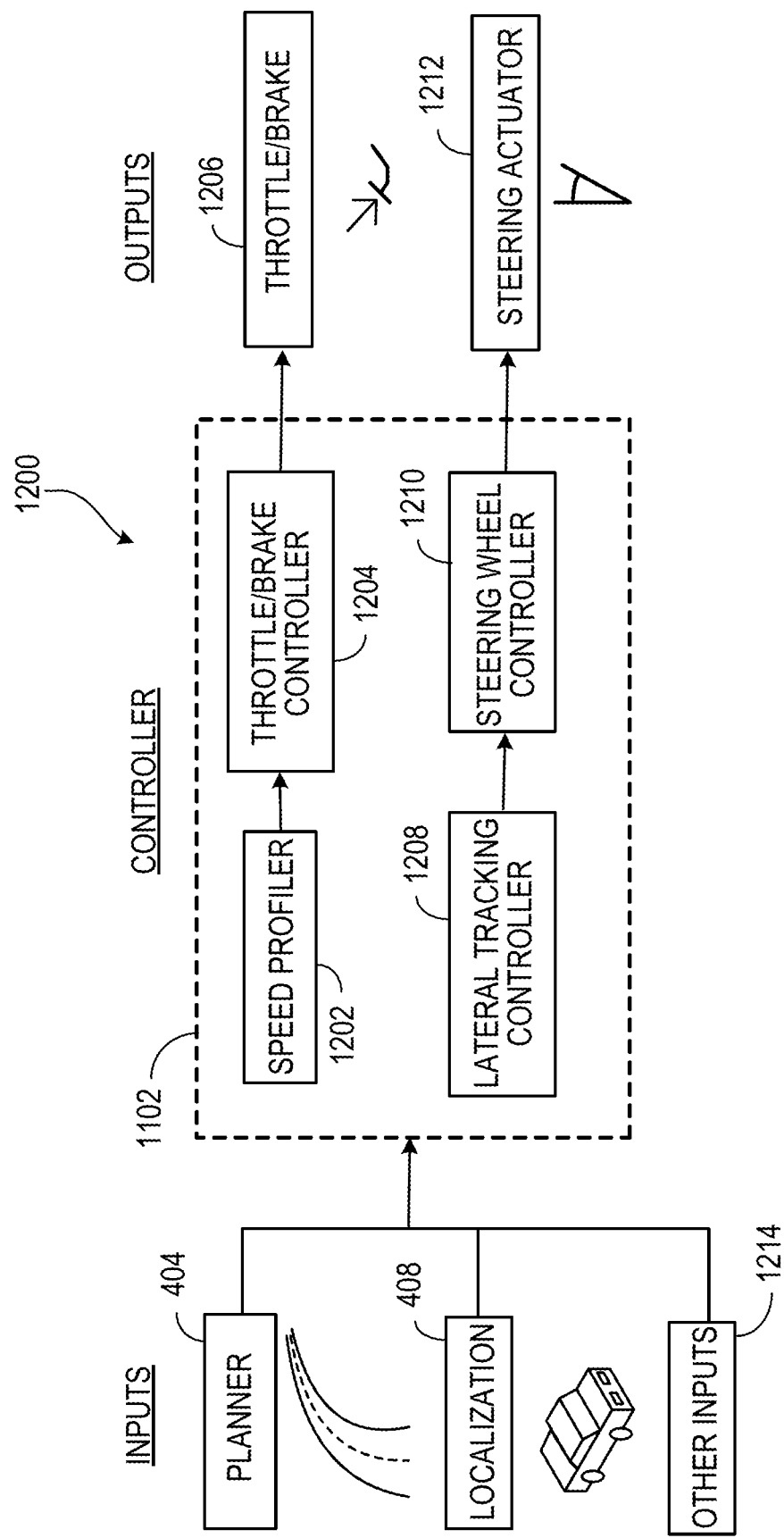
FIG. 12 is a block diagram illustrating the inputs, outputs, and components of a controller, in accordance with one or more embodiments.

FIG. 12 is a block diagram 1200 illustrating the inputs, outputs, and components of the controller 1102, in accordance with one or more embodiments. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1204 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Architecture of a Traffic Light Detection System

FIG. 13 is a block diagram illustrating a traffic light detection (TLD) system 1300 for the AV 100, in accordance with one or more embodiments. The AV 100 is illustrated and described in more detail with reference to FIG. 1. An example TLD system is introduced and described in FIG. 5. In the embodiments disclosed herein, the term "traffic light" refers to the hardware that is being detected, including supporting hardware and a frame that includes circular or square lights. The term "traffic signal" refers to the state of a traffic light, that is, whether the traffic light is a red light, a flashing yellow light, a green turn arrow, etc. The traffic signal of the traffic light is thus used to direct traffic.

The example TLD system 1300 illustrated in FIG. 13 includes a perception module 1304, a mapping module 1340, and a localization module 1360. The perception module 1304 is different from the perception module 402 illustrated and described with reference to FIG. 4. The perception module 1304 includes cameras and other sensors and is used to detect, among other things, a state of a traffic signal 1310. The perception module 1304 is implemented using the components illustrated and described with reference to FIG. 3. The perception module 1304 generates the traffic signal 1310 of a traffic light 1404, as illustrated and described in more detail with reference to FIG. 13B. The traffic light 1404 is illustrated and described in more detail with reference to FIG. 14.

The localization module 1360 is different from the localization module 408 illustrated and described with reference to FIG. 4. The localization module 1360 is used to determine, among other things, a location of the AV 100 and a location of the traffic light 1404. The localization module 1360 is implemented using the components illustrated and described with reference to FIG. 3. The mapping module 1340 stores and performs searches and computations on maps of the environment 190 to predict, among other things, a location of the traffic light 1404. The mapping module 1340 is implemented using the components illustrated and described with reference to FIG. 3.

The TLD system 1300 receives the trajectory 198 from the planning module 404. The trajectory 198 is illustrated and described in more detail with reference to FIG. 1. The planning module 404 is illustrated and described in more detail with reference to FIG. 4. The AV 100 is operating within an environment 190, illustrated and described in more detail with reference to FIG. 1. The environment 190 includes the AV 100, one or more vehicles 193, one or more pedestrians 192, intersections, and traffic lights. The one or more vehicles 193 and one or more pedestrians 192 are illustrated and described in more detail with reference to FIG. 1.

Figure 13A:
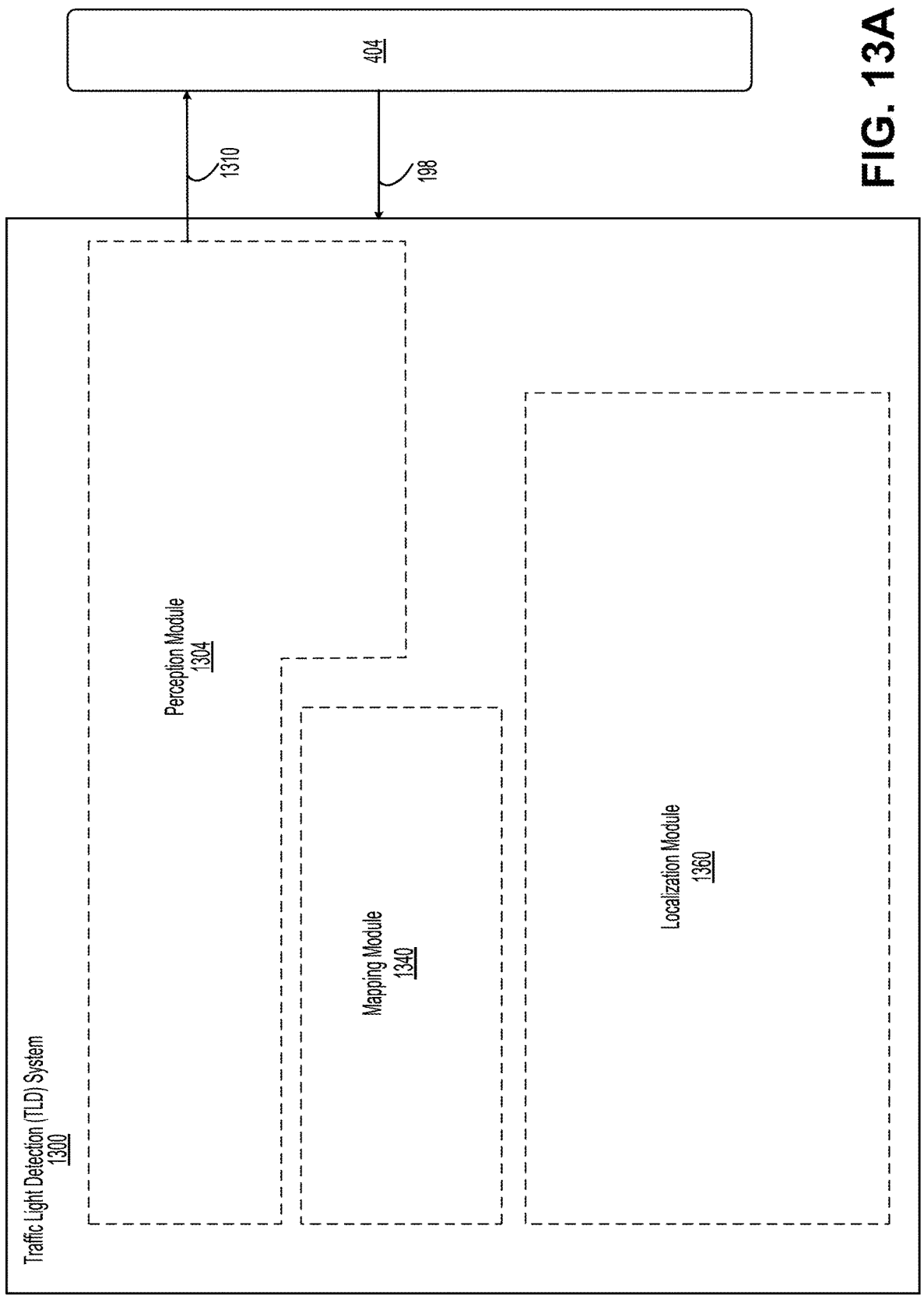
FIG. 13A is a block diagram illustrating a traffic light detection (TLD) system for a vehicle, in accordance with one or more embodiments.
Figure 13B:
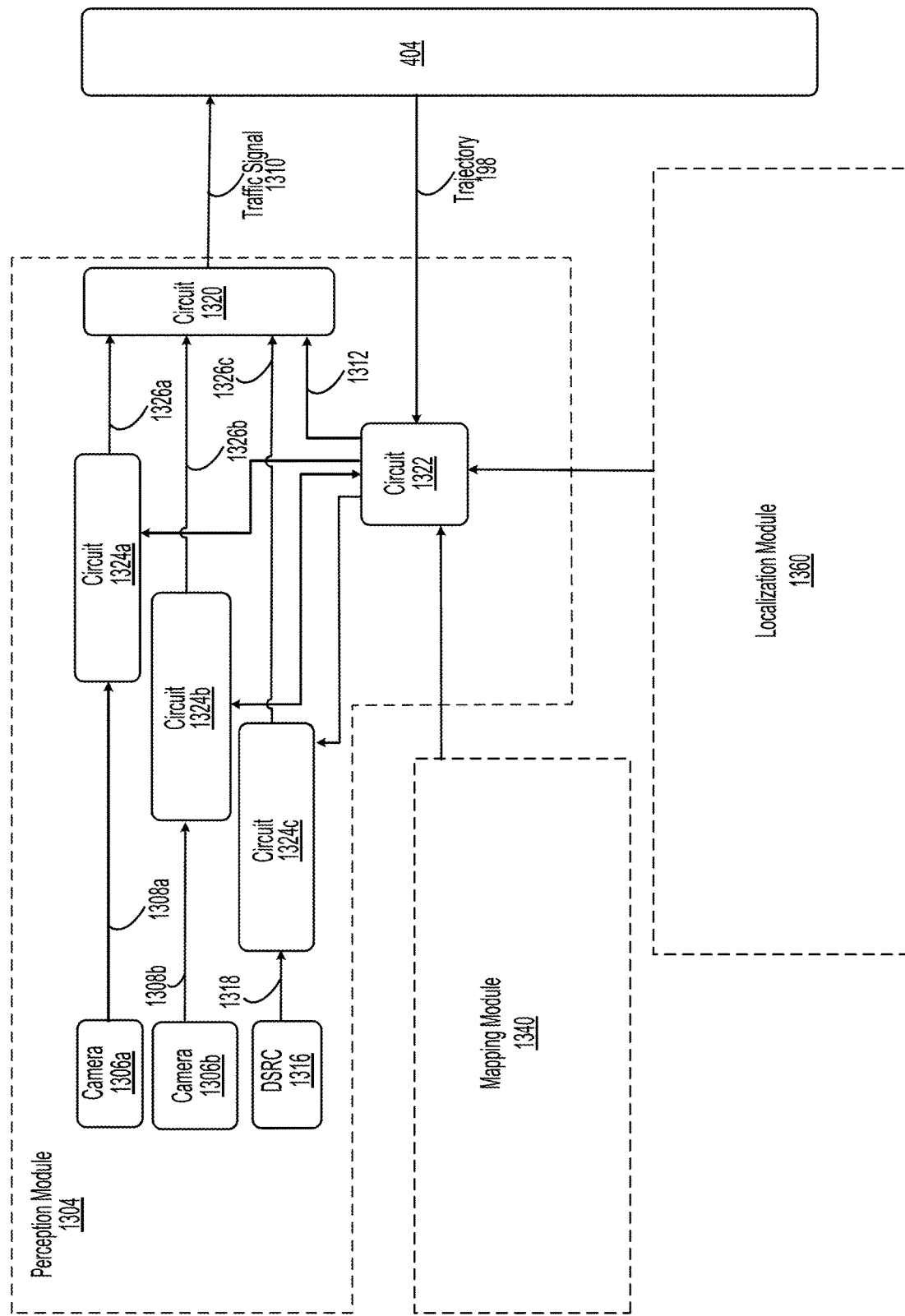
FIG. 13B is a block diagram illustrating a perception module, in accordance with one or more embodiments.
Figure 13C:
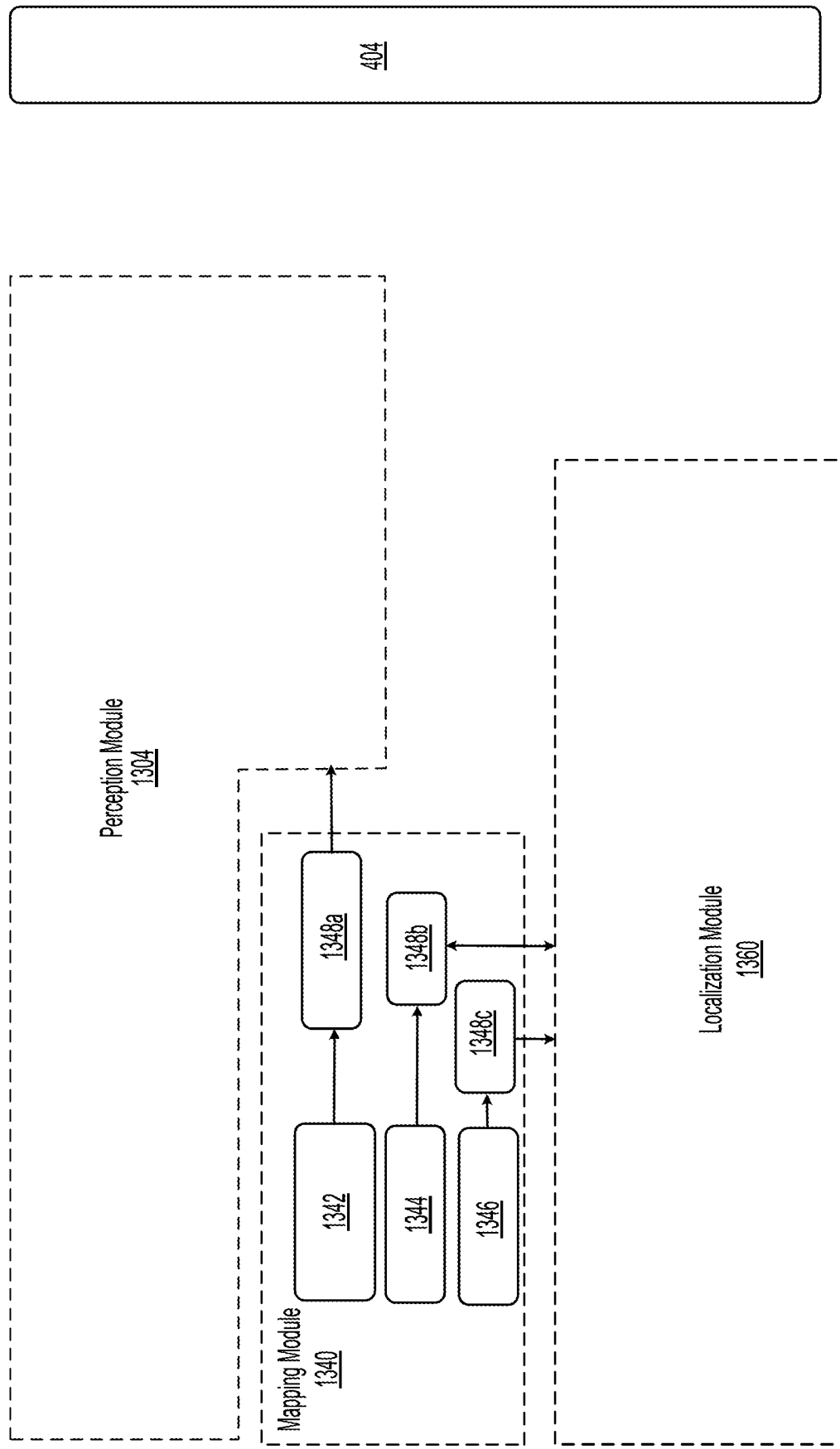
FIG. 13C is a block diagram illustrating a mapping module, in accordance with one or more embodiments.
Figure 13D:
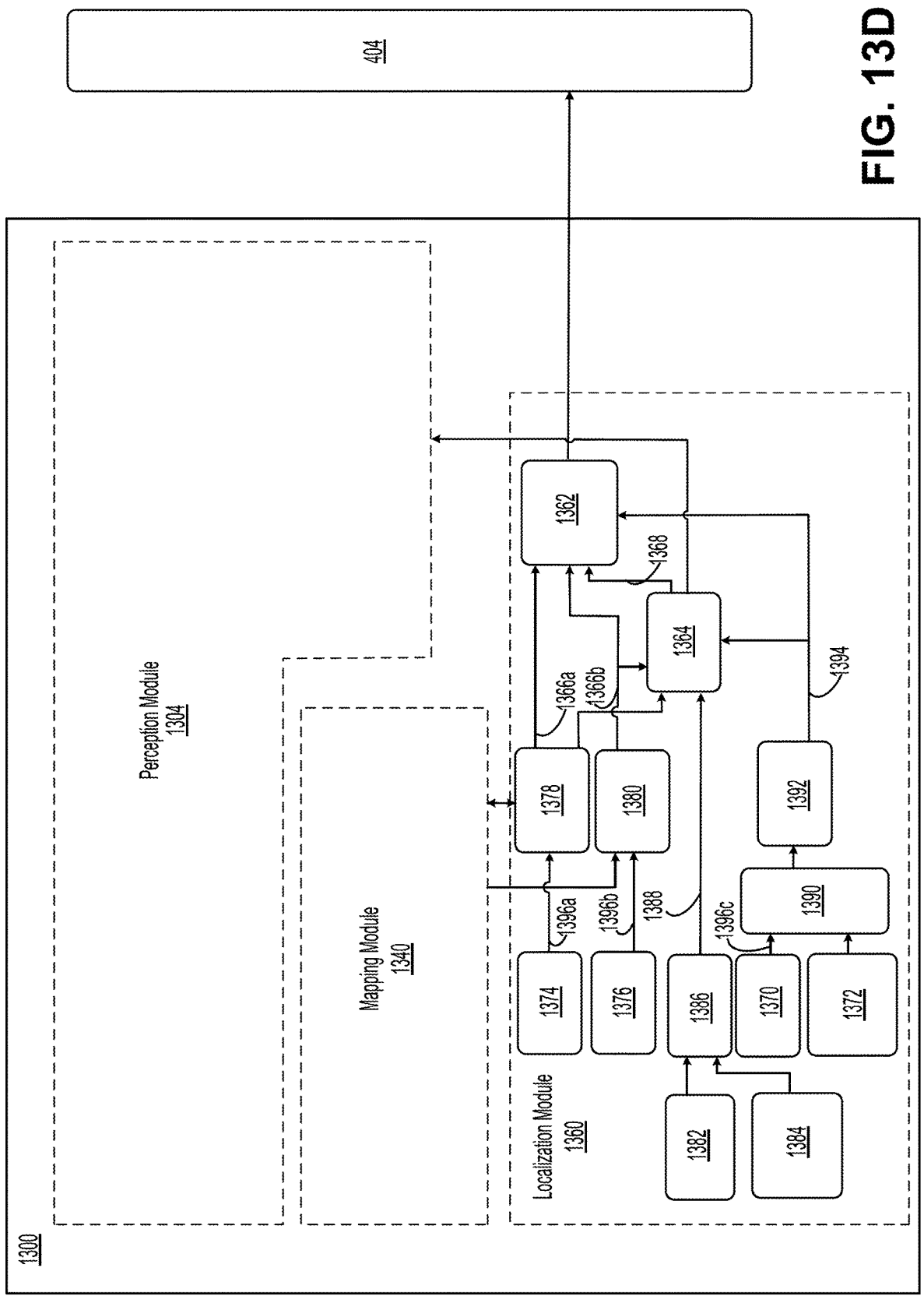
FIG. 13D is a block diagram illustrating a localization module, in accordance with one or more embodiments.

FIG. 13B is a block diagram illustrating the perception module 1304, in accordance with one or more embodiments. FIG. 13C is a block diagram illustrating the mapping module 1340, in accordance with one or more embodiments. FIG. 13D is a block diagram illustrating the localization module 1360, in accordance with one or more embodiments. In some embodiments, the components illustrated in FIGS. 13A, 13B, 13C are connected as shown in FIGS. 13A, 13B, 13C. In other embodiments, some of the connections shown in FIGS. 13A, 13B, 13C are omitted or additional connections between the components are present.

The perception module 1304 detects a traffic light located at a first spatiotemporal location based on a digital video stream 1308*a* captured by a camera 1306*a* of the AV 100. For example, the traffic light 1404 located at the location 1408 is detected. The traffic light 1404 and the location 1408 are illustrated and described in more detail with reference to FIG. 14. The camera 1306*a* can be a monocular or stereo video camera in the visible light, infrared or thermal (or both) spectra. The digital video stream 1308*a* is an electronic representation of moving visual images in the form of encoded digital data. The circuit 1324*a* performs image processing and recognition functions on the digital video stream 1308*a* to generate data 1326*a* identifying the traffic light 1404. The circuit 1324*a* is implemented using the components illustrated and described with reference to FIG. 3. In some embodiments, the circuit 1324*a* includes a general purpose CPU executing software.

A second digital video stream 1308*b* is captured by a second camera 1306*b* of the AV 100 for modular redundancy. In some embodiments, the camera 1306*a* is located at a first position on the AV 100, for example, on the roof. The camera 1306*b* is located at a second position on the AV 100, for example, on a side of the AV 100 or above the front bumper, to increase an accuracy in the detection of the traffic light 1404 based on redundancy of the digital video stream 1308*a* and the digital video stream 1308*b*.

Figure 14:
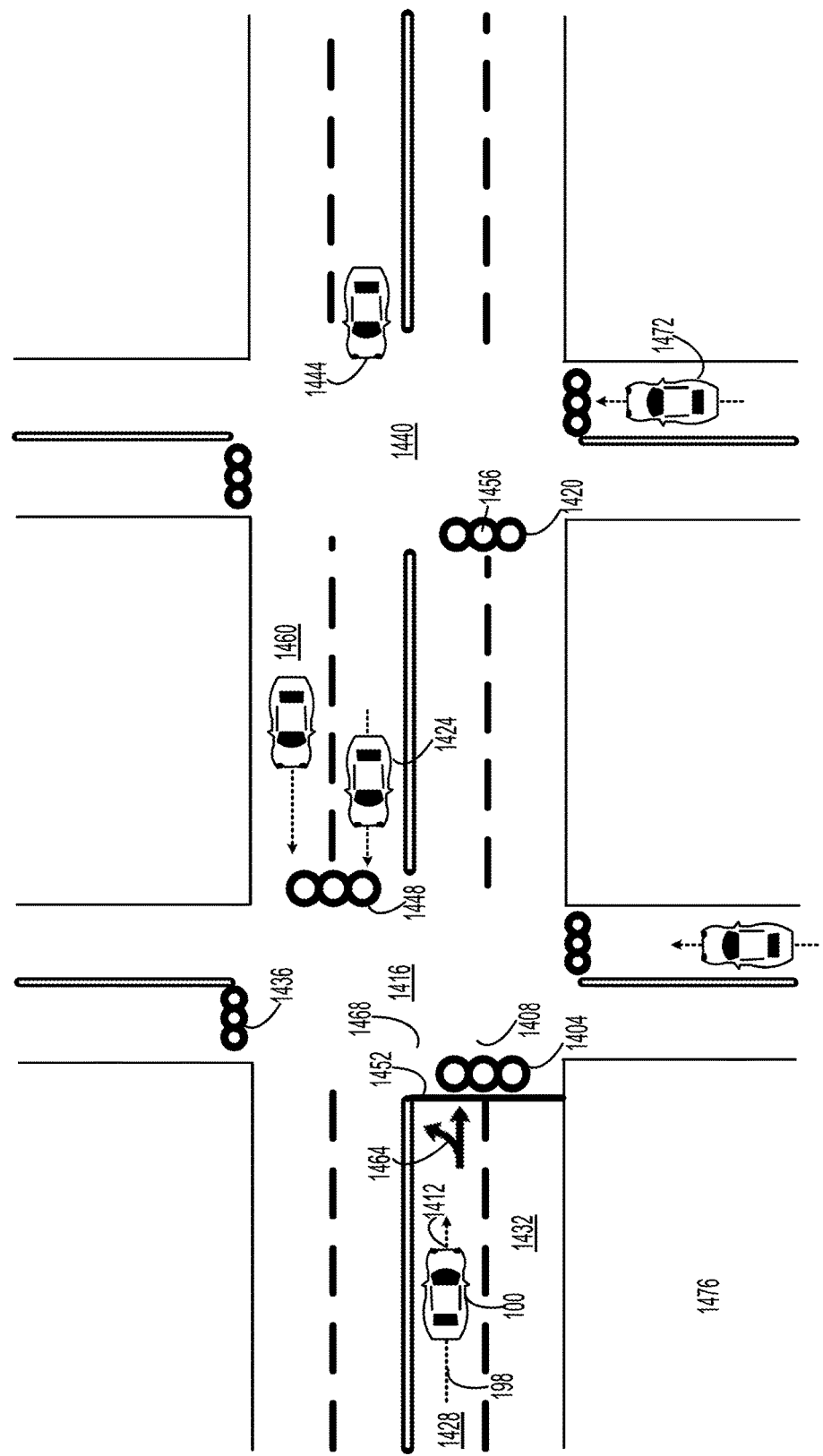
FIG. 14 illustrates an example TLD scenario, in accordance with one or more embodiments.

The digital video streams 1308*a*, 1308*b* can be compared by the circuits 1324*a*, 1324*b*, 1320 to determine differences and detect the traffic light 1404 located at the location 1408 with greater accuracy. The circuits 1324*b*, 1320 are implemented using the components illustrated and described with reference to FIG. 3. In some embodiments, the circuits 1324*b*, 1320 includes general purpose CPUs executing software. The circuit 1320 is sometimes referred to as a "Traffic Light State Detect" module or a "Traffic Light State Compare" module. The circuit 1322 uses location data of the AV 100 (generated by the localization module 1350) to determine the location 1408 of the traffic light 1404 relative to the AV 100 based on the digital video streams 1308*a*, 1308*b*. The circuit 1322 is sometimes referred to as a "positional/relational awareness" circuit. The location data includes the determined location 1408 of the traffic light 1404. In some embodiments, the circuit 1322 determines that the traffic light 1404 is expected at the location 1408 based on a semantic map 1342 of the environment 190 stored by the mapping module 1340. The circuits 1348*a*, 1322 use the determined spatiotemporal location 1412 of the AV 100 to reference the semantic map 1342. The spatiotemporal location 1412 is illustrated in FIG. 14. The circuit 1322 thus localizes the traffic light 1404 with respect to the AV 100 to facilitate traffic light detection. The circuits 1322, 1348*a* are implemented using the components illustrated and described with reference to FIG. 3. In some embodiments, the circuits 1322, 1348*a* includes general purpose CPUs executing software.

Responsive to determining that the traffic light 1404 is expected at the location 1408, the circuit 1320 detects a traffic signal 1310 of the traffic light 1404 based on the digital video stream 1308*a* and the digital video stream 1308*b*. To detect the traffic signal 1310, the circuit 1324*a* segments at least one image frame of the digital video stream 1308*a*. The circuit 1324*a* uses edge detection to detect an area of the at least one image frame corresponding to the traffic signal 1310. For example, a rectangular frame of the traffic light 1404 contains three or more circular or square lights. The circuit 1324*a* segments the rectangular area within the frame to isolate the lights. Similarly, the circuit 1324*b* processes the digital video stream 1308*b* to segment the rectangular area within the frame of the traffic light 1404 to detect the traffic signal 1310. The circuits 1320, 1324*b* are implemented using the components illustrated and described with reference to FIG. 3. In some embodiments, the circuits 1320, 1324*b* include general purpose CPUs executing software.

The perception module 1300 uses N-modular redundancy to detect the traffic signal 1310. In some embodiments, N is 3. In other embodiments, N can be 4, 5, 6, etc., depending on the number of cameras. For example, to detect the traffic signal 1310, the circuits 1324*a*, 1320 detect that the traffic signal 1310 is a first color (for example, green) based on the digital video stream 1308*a* from the camera 1306*a*. The circuits 1324*b*, 1320 detect that the traffic signal 1310 is a second color (for example, red) based on the digital video stream 1308*b* from the camera 1306*b*. The circuits 1324*c*, 1320 detect that the traffic signal 1310 is a third color (for example, red) based on the DSRC message 1318 received by the DSRC sensor 1316 of the AV 100. Responsive to detecting that the third color (red) is the same as the second color, the circuit 1320 associates the traffic signal 1310 with the second color (red).

When the camera 1306*a* is non-operational, there is latency in the digital video stream 1308*a*, or the traffic signal detection fails for another reason, such as a mismatch between the digital video streams 1308*a*, 1308*b*, the circuit 1320 detects a failure to detect the traffic signal 1310 of the traffic light 1404. Responsive to detecting the failure, the circuit 1320 associates the traffic signal 1310 with a red light. Thus, for safety, the perception module 1300 sets the a traffic light state to a red light as a default worst-case scenario whenever the circuit 1320 is unable to detect the traffic signal 1310.

In an embodiment, the circuit 1320 performs machine learning (for example, using multiple neural networks) to detect the traffic signal 1310 based on the data 1326*a*, 1326*b*. For example, the circuit 1320 can include a first neural network to detect green light and a second neural network to detect red lights. In some embodiments, the circuit 1324*a* extracts a first feature vector from the digital video stream 1308*a*. The first feature vector includes one or more features, which are compact, non-redundant representations of the image frames of the digital video stream 1308*a*, for example, pixel intensity values and pixel coordinates. The circuit 1324*b* extracts a second feature vector from the digital video stream 1308*b*. Machine learning can then be used to detect a color or a shape of the traffic signal 1310, for example, a red "don't turn right" arrow.

More than one neural network can be trained, for example, one neural network for red detection and one for green detection. The circuit 1320 includes a machine learning model executed by processors within the circuit 1320. The machine learning model is used to predict the traffic signal 1310 based on the feature vectors. For example, the machine learning model is previously trained to recognize a color of an object based on features extracted from digital video streams of the object. Training the machine learning model includes configuring the weights and internal connections within the machine learning model to recognize traffic signals of traffic lights based on feature vectors extracted from digital video streams of the traffic lights. In some embodiments, the machine learning model includes a first artificial neural network trained to recognize red lights and a second artificial neural network (e.g., a convolutional neural network) trained to recognize green lights. The first artificial neural network is independent of the second artificial neural network. In other embodiments, the circuit 1320 and the machine learning model use different machine learning techniques, such as deep learning, neural networks, linear support vector machine (linear SVM), boosting for other algorithms (e.g., AdaBoost), logistic regression, naïve Bayes, memory-based learning, random forests, bagged trees, decision trees, boosted trees, or boosted stumps.

In some embodiments, the circuit 1320 validates the detected traffic signal 1310 based on a dedicated short range communication (DSRC) message 1318 received by a DSRC sensor 1316 of the AV 100 or other communication technology. DSRC is a protocol for secure, high-speed wireless communication between vehicles and infrastructure, such as smart traffic lights, smart traffic control hubs, etc. The DRSC message 1318 is received from the traffic light 1404. The circuit 1320 compares the data 1326*a*, 1326*b* with the DSRC data 1326*c* to validate the detected traffic signal 1310. In some embodiments, the circuit 1322 validates that the traffic light 1404 is indeed located at the determined location 1408 based on the DSRC message 1318 received by the DSRC sensor 1316 of the AV 100 from the traffic light 1404. For example, the DSRC circuit 1324*c* generates the DSRC data 1326*c* that is used by the circuit 1322 to validate that the traffic light 1404 is located at the location 1408. The DSRC data 1326*c* indicates a location and state (traffic signal) of the traffic light 1404.

The validation of the traffic signal 1310, location data 1312 for the traffic light 1404, and location data for the AV 100 (e.g., location data 1366*a*) is performed to improve the data quality, that is, to ensure the data is correct and useful. In some embodiments, the validation uses validation routines, validation rules, and validation constraints that check for correctness, meaningfulness, and security of the data. In other embodiments, the validation checks whether the outputs of a statistical model are acceptable with respect to the real world data generated or received by the TLD system 1300. In some embodiments, the DSRC sensor 1316 of the AV 100 receives a DSRC message 1318 from the traffic light 1404 indicating that the traffic signal 1310 will change at a particular time T1. For example, the DSRC message 1318 announces the color of the traffic signal 1310 and that the traffic signal 1310 will change in a specified amount of time T2 from the current time T3, where T1=T2+T3.

The localization module 1360 determines that the AV 100 is located at the spatiotemporal location 1412 based on sensor data. To determine the spatiotemporal location 1412, one or more RADARs 1374 generate RADAR data 1396*a*. A RADAR localization unit 1378 generates location data 1366*a* for the AV 100 based on the RADAR data 1396*a*. In some embodiments, one or more LiDARs 1376 generate LiDAR data 1396*b*. A LiDAR localization unit 1380 generates location data 1366*b* for the AV 100 based on the LiDAR data 1396*b*. In some embodiments, one or more GNSS receivers 1370 generate GNSS data 1396*c*. A GNSS localization circuit 1392 further generates the location data 1394 for the AV 100 based on the GNSS data 1396*c*. The circuit 1392 is implemented using the components illustrated and described with reference to FIG. 3. In some embodiments, the circuit 1392 includes a general purpose CPU executing software.

The localization circuit 1362 validates the location data 1366*a* generated using the RADARs 1374, the location data 1366*b* generated using the LiDARs 1376, and/or the location data 1394 generated using the GNSS receivers 1370 against location data 1368 generated by the localization circuit 1364. In some embodiments, the localization circuit 1362 includes a first filter (e.g., a Bayesian filter, a Kalman filter, etc.) for more accurate localization. The localization circuit 1364 includes a second filter (e.g., a Bayesian filter, a Kalman filter, an extended Kalman filter, an unscented Kalman filter, a particle filter, etc.) to filter the location data 1366 to generate the location data 1368. The second filter improves the localization accuracy, while the validation performed by the localization circuit 1362 reduces error margins in the filtering compared to the other localization modes. For example, if the localization circuit 1362 detects a failure in the validation of the spatiotemporal location 1404 (determined by either the localization circuit 1362 or the localization circuit 1364) against either the location data 1366*a*, 1366*b*, 1394 or the location data 1368, the control circuit 406 can stop the AV 100 in accordance with a comfort profile. The localization circuit 1362 further validates the location data 1366*a*, 1366*b*, 1368 against the GNSS location data 1394 generated by the GNSS localization circuit 1392. The circuits 1362, 1364 are implemented using the components illustrated and described with reference to FIG. 3. In some embodiments, the circuits 1362, 1364 include general purpose CPUs executing software.

The circuits 1362, 1348*a* validate that the AV 100 is indeed located at the spatiotemporal location 1412 based on the semantic map 1342. The circuits 1348*a*, 1362 reference the semantic map 1342 using the location 1408 of the traffic light 1404. The localization module 1360 thus compares the location 1408 of the traffic light 1404 with an annotated map (semantic map 1342) to localize the AV 100. In some embodiments, the circuits 1348*b*, 1362 reference a RADAR-based map 1344 using the location 1408 of the traffic light 1404 to localize the AV 100. In some embodiments, the circuits 1348*c*, 1362 reference a LiDAR-based map 1346 using the location 1408 of the traffic light 1404 to localize the AV 100 and provide even greater redundancy and fault tolerance, thus increasing localization accuracy.

The first filter (e.g., a Bayesian filter, a Kalman filter, etc.) is executed by the processors of the localization circuit 1362 to determine the spatiotemporal location 1412 of the AV 100 by filtering the location data 1366*a*, 1366*b*, 1394. The spatiotemporal location 1412 is associated with one or more lanes, for example, lanes 1428, 1432 illustrated in FIG. 14. The localization circuit 1362 further validates the spatiotemporal location 1412 of the AV 100 against the location data 1366*a*, 1366*b*, 1394 based on modular redundancy of the LiDARs 1374, RADARs 1376, and GNSS receivers 1370. For example, triple-modular redundancy is used. Upon detecting a localization fault, the localization circuit 1362 notifies the planning module 404, which initiates a safe stop maneuver in accordance with a comfort profile.

A steering wheel sensor 1384 of the AV 100 generates data, such as a steering wheel angle and an angular velocity. Multiple wheel sensors of the AV 100 generate data, such an angle and speed of the wheels. Additional detail on wheel speed sensors is presented with reference to FIG. 1. An odometry unit 1386 generates odometry data 1388 based on the data from the steering wheel sensor 1384 and wheel sensors 1382 of the AV 100. In some embodiments, an inertial measurement unit (IMU) 1372 generates data, such as measuring acceleration and angular rates (that can be converted to pitch, yaw, roll), or vehicle backup detection (or rolling backwards). In an embodiment, the data from the IMU 1372 is validated against the data 1396*c* by the validation circuit 1390.

The second filter (e.g., a Bayesian filter, a Kalman filter, etc.) is executed by one or more processors within the localization circuit 1364 to determine that the AV 100 is operating in a particular lane 1428 of the one or more lanes 1428, 1432 by filtering the odometry data 1388 and the data from the IMU 1372. To localize the AV 100 in the particular lane 1428, the lane 1428 can also be associated with the traffic light 1404 using the semantic map 1342. For example, to determine that the AV 100 is operating in the particular lane 1428, the localization circuit 1364 references the semantic map 1342. The semantic map 1342 represents a drivable area including the one or more lanes 1428, 1432. The localization circuit 1364 uses the odometry data 1388 filtered by the second filter to reference the semantic map

1342. In some embodiments, the localization circuits 1362, 1364 validate the particular lane 1428 against the trajectory 198 of the AV 100. The trajectory 198 is determined by the planning module 404 prior to determining that the vehicle is operating in the particular lane 1428. Therefore, the localization circuits 1362, 1364 can verify that the AV 100 is indeed operating in a lane intended by the planning module 404.

The circuit 1320 identifies the traffic light 1404 corresponding to the particular lane 1428 based on the digital video stream 1308a captured by the camera 1306a of the AV 100. In some embodiments, the circuit 1320 validates the traffic light detection using modular redundancy of the cameras 1306a, 1306b and the DSRC sensor 1316. The AV 100 uses the control circuit 406 to operate in accordance with the traffic signal 1310 of the traffic light 1404.

In some embodiments, the localization module 1360 determines that the AV 100 is located in an urban area based on the location data 1394 and the GNSS data 1396c. Prior to validating the spatiotemporal location 1412 of the AV 100, the circuit 1362 generates weighted location data. The weighted location data is generated by weighting the LiDAR data 1366b received from the one or more LiDARs 1376 and RADAR data 1366a received from the one or more RADARs 1374 higher than GNSS data 1396c received from the one or more GNSS receivers 1370. The spatiotemporal location 1412 is validated against the weighted location data. When the localization reveals that the AV 100 is operating in a more-dense urban area, the GNSS data may not be granular enough for more accurate localization. Hence, a greater weight is used for the LiDAR data 1366b and the RADAR data 1366a. On the other hand, the localization module 1360 can determine that the AV 100 is located in a rural area based on the location data 1394 and the GNSS data 1396c. When the localization reveals that the AV 100 is operating in a wide-open, rural area, the LiDAR and RADAR data may have little content. The circuit 1362 generates the weighted location data by weighting the GNSS data 1396c received from the one or more GNSS receivers 1370 higher than the LiDAR data 1366b received from the one or more LiDARs 1376 and RADAR data 1366a received from the one or more RADARs 1374.

The planning module 404 uses the detected traffic signal 1310, the location data 1312 of the traffic light 1404, and the spatiotemporal location 1412 of the AV 100 to determine a trajectory 198 of the AV 100 in accordance with the traffic signal 1310. The planning module 404 is illustrated and described in greater detail with reference to FIG. 4. Prior to detecting the traffic signal 1310, the circuit 1320 predicts that the traffic signal 1310 is a red light for determining the trajectory 198 of the AV 100. That is, the TLD system 1300 assumes that the state of the traffic light 1404 is a red light whenever the state is unknown or has not been detected yet.

The control circuit 406 of the AV 100 operates the AV 100 in accordance with the determined trajectory 198. The control circuit 406 is illustrated and described in more detail with reference to FIG. 4. The control circuit 406 is built using the components illustrated and described in more detail with reference to FIG. 3. In some embodiments, responsive to detecting the traffic light 1404, the AV 100 uses the control circuit 406 or the perception module 1304 to adjust an orientation of at least one of the cameras 1306a, 1306b to point the cameras 1306a, 1306b at the traffic light 1404 while the AV 100 is moving towards the traffic light 1404. As the AV 100 moves, the cameras 1306a, 1306b angle upwards or sideways towards the traffic light 1404 as the AV 100 approaches the traffic light 1404 for better image capture.

In some embodiments, the control circuit 406 of the AV 100 operates the AV 100 in accordance with a comfort profile. The comfort profile can be stored in a data storage unit 142 or memory 144 of the AV 100. The data storage unit 142 and memory 144 are illustrated and described in more detail with reference to FIG. 1. The comfort profile includes multiple data fields that can impact the comfort of a passenger in the AV 100, each describing one or more operating parameters, such as a maximum operational speed, a maximum amplitude of fluctuation of acceleration, a maximum longitudinal acceleration, a maximum lateral acceleration, a maximum change in steering angle, a maximum rate of turn, or a maximum limit on a magnitude of jerk for the AV 100. The operating parameters provide a comfortable ride to passengers when the AV 1010 is operated. The planning module 404 uses the comfort profile to plan the trajectory 198 for the AV 100.

FIG. 14 illustrates an example traffic light detection scenario. In FIG. 14, the AV 100 is located at the spatiotemporal location 1412 and is approaching an intersection 1416. The AV 100 is illustrated and described in greater detail with reference to FIG. 1. The AV 100 detects, using the circuit 1320, that a traffic signal 1310 of the traffic light 1404 at the intersection 1416 is a green light. The circuit 1320 and traffic signal 1310 are illustrated and described in greater detail with reference to FIG. 13. The AV 100 uses the cameras 1306a, 1306b to detect absence of objects (e.g., natural obstructions 191, vehicles 193, pedestrians 192, cyclists, and other obstacles) at the location 1408. The cameras 1306a, 1306b, natural obstructions 191, vehicles 193, and pedestrians 192 are illustrated and described in greater detail with reference to FIGS. 1 and 13. The planning module 404 transmits a message to the control circuit 406 to operate the AV 100 in accordance with the determined trajectory 198. The planning module 404, control circuit 406, and trajectory 198 are illustrated and described in greater detail with reference to FIGS. 1 and 4.

In some embodiments, the AV 100 detects, using the cameras 1306a, 1306b, that a pedestrian 192 is walking at the location 1408 (where the traffic light 1404 is located) based on the digital video streams 1308a, 1308b. The digital video streams 1308a, 1308b are illustrated and described in greater detail with reference to FIG. 13. Although the traffic signal 1310 is a green light, the planning module 404 adjusts the trajectory 198 of the AV 100, such that the control circuit 406 decreases a speed of the AV 100 to avoid a collision of the AV 100 with the pedestrian 192. Therefore, if the traffic signal 1310 is a green light but there is a pedestrian in the crosswalk (of intersection 1416), the AV 100 will slow down or stop to avoid a collision.

When operating in the environment 190, the perception module 1304 can detect multiple traffic lights 1404, 1420, 1436. The environment 190 and the perception module 1304 are illustrated and described in greater detail with reference to FIGS. 1 and 13. The multiple traffic lights 1404, 1420, 1436 are detected based on one or both of the digital video streams 1308a, 1308b, as illustrated and described in greater detail with reference to FIG. 13. The multiple traffic lights 1404, 1420, 1436 include the traffic light 1404 that is controlling the operation of the AV 100 based on the lane 1428 the AV 100 is operating in and the spatiotemporal location 1412 of the AV 100. The perception module 1304 identifies the controlling traffic light 1404 from the multiple traffic lights 1404, 1420, 1436. For example, when the AV 100 is operating on a multi-lane road, as illustrated in FIG. 14, the perception module 1304 maps each detected traffic light to a lane. The AV 100 thus obeys the traffic signal 1310 of the traffic light 1404 controlling the lane 1428 the Av 100 is operating in based on the spatiotemporal location 1412 determined by the localization module 1360, illustrated and described in greater detail with reference to FIG. 13.

In some embodiments, the DSRC sensor 1316 of the AV 100 receives a DSRC message 1318 indicating that the traffic signal 1310 will change at a particular time T1. The DSRC sensor 1316 and DSRC message 1318 are illustrated and described in greater detail with reference to FIG. 13. The planning module 404 generates a trajectory 198 in accordance with the message. For example, the AV 100 can receive DSRC messages from the traffic light 1404 to determine if a transit signal priority change is about to be made. In some embodiments, the AV 100 determines that the traffic light 1404 is non-operational due to a power outage. For example, the cameras 1306a, 1306b can detect that several traffic lights 1404, 1420 in the area are flashing red or yellow. Alternatively, the DSRC sensor 1316 can receive a DSRC message 1318 indicating that the traffic light 1404 is non-operational. The control circuit 406 stops the AV 100. Therefore, if the AV 100 detects that the traffic light 1404 or several traffic lights are not working (for example, because of an electrical power failure), the AV 100 will stop before the intersection 1416 and then proceed only when other turning or approaching vehicles 1424, bicycles, or pedestrians 192 have stopped or are absent.

In some embodiments, the TLD system 1300 receives control data from the control circuit 406. The TLD system 1300 is illustrated and described in greater detail with reference to FIG. 13. The control data includes a speed of the AV 100 or a steering angle of the AV 100. The localization module 1360 relates the lane 1428 to the intersection 1416 using the trajectory 198 from the planning module 404 and the control data. The circuit 1322 further associates the traffic light 1404 with the intersection 1416 of the environment 190 in which the AV 100 is operating. The circuit 1322 performs the associating based at least on the control data.

The circuit 1348a references the semantic map 1342 based on the spatiotemporal location 1412 of the AV 100 as the AV 100 is operating. The circuit 1348a and the semantic map 1342 are illustrated and described in more detail with reference to FIG. 13. Based on the semantic map 1342, the circuits 1348a, 1322 predict a particular time T1 at which the AV 100 will encounter the traffic light 1420. The circuit 1322 is illustrated and described in more detail with reference to FIG. 13. For example, the circuit 1322 corresponds the location data 1368 to the semantic map 1342 to determine an amount of time T2 in which the AV 10 will encounter the traffic light 1420. In some embodiments, the circuit 1342 uses the RADAR-based map 1344 and/or the LiDAR-based map 1346 instead of or in addition to the semantic map 1342. The RADAR-based map 1344 and the LiDAR-based map 1346 are illustrated and described in more detail with reference to FIG. 13. The control circuit 406 adjusts an orientation of the camera 1306a prior to the particular time T1, such that the camera 1306a is pointing at the traffic light 1420 at the particular time T1. Thus, at the time T1 that the AV 100 expects a traffic light, the camera 1306a is oriented at an angle suitable for capturing video of the traffic light.

In some embodiments, the AV 100 is operating at a location 1444, illustrated in FIG. 14. The perception module 1304 detects a traffic light 1448 based on the digital video streams 1308a, 1308b as described in more detail with reference to FIG. 13. The traffic light 1448 is located at the intersection 1416. The AV 100 is approaching or located at an intersection 1440. When the AV 100 is at or near an intersection (e.g., intersection 1440) and the cameras 1306a, 1306b sense the presence of a traffic light (e.g., traffic light 1448), the spatial location of the AV 100 is used to determine whether the traffic light 1448 is actually located at another nearby intersection ((e.g., intersection 1416) or controlling another lane. The intersection 1440 at which the AV 100 is actually located may have no traffic light. The circuit 1320 determines that the traffic light 1448 is located at the intersection 1416 that is different from the intersection 1440. The circuit 1320 performs the determination based on the location data 1312, the odometry data 1388, and the digital video streams 1308a, 1308b. The odometry data 1388 is illustrated and described in more detail with reference to FIG. 13.

In some embodiments, two lanes are adjacent to each other and have the same direction of travel but belong to different roads. The circuit 1320 senses presence of a particular traffic light (controlling a particular lane different from the lane 1428). The circuit 1320 also determines that the particular traffic light corresponds to the particular lane different from the lane 1428. The circuit 1320 performs the determination based on the location data 1312, the odometry data 1388, and the digital video streams 1308a, 1308b.

In some embodiments, the circuit 1320 detects that the traffic signal 1310 of the traffic light 1404 has transitioned from a green light to a yellow light based on the digital video streams 1308a, 1308b captured by the cameras 1306a, 1306b of the AV 100. Prior to detecting that the traffic signal 1310 has transitioned from a green light to a yellow light, the circuit 1320 associates the traffic signal 1310 with a red light (as a worst case, safety mechanism). The transition of the traffic signal 1310 is used to trigger a localization of the AV 100 relative to a stop line 1452 of the intersection 1416. For example, if the circuit 1320 detects an unambiguous traffic light state (for example, "red"), the distance D1 from the AV 100 to the stop line 1452 is used by the planning module 404 to determine behavior of the AV 100 (for example, deceleration in accordance with a comfort profile to the stop line 1452, a hard stop, etc.).

Continuing with the example of the traffic signal 1310 transition to a yellow light, the circuit 1320 validates that the traffic signal 1310 is a yellow light, based on a DSRC message 1318 received by a DSRC sensor 1316 of the AV 100. The DSRC message 1318 is transmitted by a DSRC transmitter of the traffic light 1404 and can be processed by the circuit 1324c. For example, the circuit 1320 associates the traffic signal 1310 with a red light until determined with a high level of confidence otherwise. Further, if the digital video streams 1308a, 1308b are ambiguous or diagnostic failures occur, the TLD system 1300 continues to associate the traffic signal 1310 with a red light.

The circuit 1320 determines that the traffic signal 1310 will transition to a red light in a particular amount of time T2 based on the digital video streams 1308a, 1308b. The circuit 1320 determines an elapsed time T4 after the traffic signal 1310 transitioned to a yellow light. Based on the elapsed time T4, the circuit 1320 determines the particular amount of time T2. For example, the circuit uses the elapsed time T4 that has progressed from when the traffic signal 1310 changed from a green light to a yellow light to determine whether to stop. Based on the DSRC message 1318, the circuit 1320 determines the location 1408 of the traffic light 1404. The TLD system 1300 validates the particular amount of time T2 against the semantic map 1342. The TLD system 1300 references the semantic map 1342 by the location 1408 of the traffic light 1404. For example, the semantic data from the semantic map 1342 can validate how long the traffic signal 1310 takes to change.

The circuit 1320 determines that the AV 100 is located at a particular distance D1 from the stop line 1452 of the traffic light 1404 based on the digital video streams 1308a, 1308b and the location 1412 of the AV 100. The planning module 404 determines that the AV 100 is able to stop at the stop line 1452 within the particular amount of time T2 in accordance with a comfort profile. The planning module 404 makes the determination based on the particular amount of time T2 and the particular distance D1 from the stop line. In an embodiment, the planning module 404 determines an amount of deceleration to be applied to the AV 100 to stop the AV 100 at the stop line 1452 within the particular amount of time T2 in accordance with the comfort profile. In some scenarios, there can be another vehicle 193 ahead the AV 100. The planning module 404 determines a distance D2 between the AV 100 and the other vehicle 193 ahead of the AV 100. The planning module 404 determines amount of deceleration to be applied to the AV 100 to stop the AV 100 based on the distance D2 between the AV 100 and the other vehicle 193. In some embodiments, the planning module 404 determines the amount of deceleration to apply based on the distance D1 and the time T2, the distance D2 from the vehicle 193 ahead, or the comfort profile. The control circuit 406 of the AV 100 stops the AV 100 at the stop line 1452 within the particular amount of time T2 in accordance with the comfort profile.

Based on the particular amount of time T2 and the particular distance from the stop line 1452, the planning module 404 can determine that the AV 100 is unable to stop at the stop line 1452 within the particular amount of time T2 in accordance with the comfort profile (for example, if T2 is too small. The particular distance from the stop line 1452 is analyzed with the comfort profile. The planning module 404 adjusts the trajectory 198 to operate, by the control circuit 406, the AV 100 through the intersection 1416 within the particular amount of time T2. For example, if the traffic signal 1310 is a yellow light and the particular distance from the stop line 1452 is too small to comfortably stop, the AV 100 will keep moving through the yellow light.

In some embodiments, the planning module 404 determines that the AV 100 is unable to stop in the lane 1428 within the particular amount of time T2 in accordance with the comfort profile. For example, there can be another vehicle 193 in the lane 1428 ahead of the AV 100, hence, hard braking is required. To stop the AV 100 at the stop line 1452 within the particular amount of time T2 in accordance with the comfort profile, the planning module 404 determines a trajectory 198 for the AV 100 from the lane 1428 to another lane, for example lane 1432. The AV 100 can thus change lanes, such that the AV 100 does not need to brake hard if there is another vehicle 193 ahead of the AV 100 in the lane 1428 but there is sufficient distance to the stop line 1452 in the other lane 1432.

When the AV 100 is approaching the intersection 1440, the circuit 1320 detects the traffic light 1420 located at the intersection 1440 based on the digital video streams 1308a, 1308b. The circuit 1320 associates a traffic signal 1456 of the traffic light 1420 with a red light (initial, worst case scenario for safety). The circuit 1320 detects that the traffic signal 1456 is a green light based on the digital video streams 1308a, 1308b. Responsive to detecting that the traffic signal 1456 is a green light, the planning module 404 and control circuit 406 operate the AV 100 through the intersection 1440. For example, consider a scenario in which the AV 100 approaches a four-way, single lane, intersection, governed by a single traffic light. A traffic signal of the traffic light is a green light and remains a green light as the AV 100 approaches. (Prior to detecting the traffic signal, the AV 100 assumes the traffic signal is a red light.) Once the AV 100 detects the green light, the AV 100 proceeds through the intersection.

The circuit 1320 can detect that the traffic signal 1456 is a yellow light based on a first image frame of the digital video stream 1308a. The circuit 1320 can detect that the traffic signal 1456 was a red light based on a second image frame of the digital video stream 1308a, where the second image frame was captured earlier in time than the first image frame. The circuit 1320 predicts that the traffic signal 1456 will change to a green light. Therefore, based on a prior state (red or green) of the traffic signal 1456, detecting a yellow light can mean either Go or Stop.

Consider a scenario in which the AV 100 is operating in a lane 1460 and approaching the intersection 1416. The TLD system 1300 determines that the trajectory 198 is directing the AV 100 to turn right at the traffic light 1448. The traffic light 1448 is located at the intersection 1416. The circuit 1320 detects an absence of objects (e.g., natural obstructions 191, vehicles 193, pedestrians 192, cyclists, and other obstacles) in the intersection 1416 based on the digital video streams 1308a, 1308b. Responsive to detecting the absence of objects in the intersection 1416, the planning module 404 and control circuit 406 operate the AV 100 in accordance with the trajectory 198. If the AV 100 detects that a traffic signal of the traffic light 1448 is a red light and receives instructions from the planning module 404 to turn right at the intersection 1416, the AV 100 will turn right on the red light only after stopping and yielding to pedestrians 192. The circuit 1320 can detect a traffic sign at the intersection 1416 based on the digital video streams 1308a, 1308b. The traffic sign indicates that a vehicle should not turn right on a red light (No Turn On Red). The control circuit 406 stops the AV 100 at the intersection 1416 until the traffic signal of the traffic light 1448 is one of a green light or a right green arrow. If the TLD 1300 detects a red light and receives instructions from the planning module 404 to turn right, the TLD 1300 will scan for a sign posted for No Turn On Red. The AV 100 will turn right on a red light only in absence of such a sign.

Consider a scenario in which the AV 100 is operating in lane 1428 and approaching the intersection 1416. The control circuit 406 operates the AV 100 in the lane 1428 in accordance with the trajectory 198 of the AV 100. The trajectory 198 directs the AV 100 to turn left at the intersection 1416. The localization module 1360 detects that the AV 100 is approaching the intersection 1416. For example, the possible traffic signal configurations of the traffic signal 1310 are a blinking red light, a blinking yellow light, a green light and a red left turn arrow, etc.

To detect that the AV 100 is approaching the intersection 1416, the localization module 1362 determines the spatiotemporal location 1412 of the AV 100 based on sensor data received from one or more sensors of the AV 100. In some embodiments, the localization circuit 1364 performs Kalman filtering on the GNSS data 1396c, the RADAR data 1396a, and/or the LIDAR data 1396b to improve the localization accuracy. The second filter is executed by the localization circuit 1364 to generate filtered sensor data, where the sensor data includes the GNSS data 1396c, the RADAR data 1396a, and/or the LIDAR data 1396b. In some embodiments, the localization module 1362 validates the filtered sensor data against the sensor data to provide the spatiotemporal location. The sensor data can also be validated against the digital video streams 1308a, 1308b by the circuit 1322.

The localization circuit 1362 determines a distance D2 of the AV 100 from the intersection 1416 using the semantic map 1342 referenced by the spatiotemporal location 1412. For example, the semantic map 1342 is included in the TLD system 1300 to facilitate relational awareness of the following: (1) relating the AV 100 to a lane (e.g., lane 1428); (2) relating the lane 1428 to an intersection (e.g., intersection 1416) using the trajectory 198 from the planning module 404; (3) relating the lane 1428 and intersection 1416 to a traffic light (e.g., traffic light 1404); and (4) relating the AV 100 to a stop line (e.g., the stop line 1452).

The planning module 404 determines that the AV 100 can turn left at the intersection 1416 from the lane 1428 based on sensor data from the cameras 1306a, 1306b and other sensors described in this specification. For example, the sensor data includes digital video streams of lane markings 1464 of the lane 1428. The TLD system 1300 detects that the traffic signal 1310 of the traffic light 1404 located at the intersection 1416 is either a green left turn arrow or a green light. The TLD system 1300 is implemented to "fail safe." To support the different traffic signal configurations, the TLD system 1300 tracks the traffic signal sequences. For example, the traffic signal 1310 can be a green light with a red turn arrow, meaning a vehicle can proceed straight through the intersection 1416 but not turn left. Responsive to the TLD system 1300 detecting that the traffic signal 1310 is a green left turn arrow, the planning module 404 and the control circuit 406 operate the AV 100, such that the AV 100 turns left at the intersection 1416 in accordance with the trajectory 198.

In another scenario, responsive to detecting that the traffic signal is a green light, the perception module 402 uses one or more sensors (for example, monocular or stereo video cameras 122 in the visible light, infrared or thermal (or both) spectra, LiDAR 123, RADAR, or ultrasonic sensors) to scan the intersection 1416. The perception module 402 is illustrated and described in more detail with reference to FIG. 4. The scanning is performed to detect other vehicles (for example, the vehicle 1424) approaching the intersection 1416 in a first direction opposite to a second direction in which the AV 100 is operating. For example, the TLD system 1300 detects a green left turn signal but yields to the vehicle 1424 travelling in the opposite direction. Responsive to detecting an absence of other vehicles 193 approaching the intersection 1416 in the first direction, the planning module 404 and the control circuit 406 operate the AV 100, such that the AV 100 turns left at the intersection 1416 in accordance with the trajectory 198.

Responsive to detecting that the traffic signal 1310 is a green light, the perception module 402 can detect that another vehicle 1424 is approaching the intersection 1416 in a first direction opposite to a second direction in which the AV 100 is operating. The perception module 402 and planning module 404 determine that the AV 100 is able to turn left in accordance with a comfort profile before the other vehicle 1424 reaches the intersection 1416. For example, the AV 100 determines a speed of the other vehicle 1424 approaching in the opposite direction and a distance D3 between the other vehicle 1424 and the intersection 1416. The planning module 404 uses the comfort profile to determine whether to turn left.

Consider a scenario in which the AV 100 is turning left from the lane 1428 at the intersection 1416. While the AV 100 is turning left, the circuit 1320 detects that the traffic signal 1310 has transitioned from a green left turn arrow to a red light. Responsive to detecting that the traffic signal 1310 has transitioned from a green left turn arrow to a red light, the localization module 1360 determines a new spatiotemporal location 1468 of the AV 100 relative to the intersection 1416 based on control data received from the control circuit 406. The control data includes an angle of the steering wheel and a speed of the AV 100. The angle of the steering wheel is determined from the steering control 102 and/or the steering input 1108, illustrated and described in more detail with reference to FIGS. 1 and 11. In some embodiments, the odometry data 1388 is also used. The planning module 404 generates a new trajectory for the AV 100 based on the new spatiotemporal location 1468. For example, if the traffic signal 1310 is a green left turn arrow that is turning into a red light, data from the one or more GNSS receivers 1370, the IMU 1372, the one or more wheel sensors 1382 (that measure the wheel angle and speed), the steering wheel sensor 1384, or the odometry unit 1386 is used to determine how far the AV 100 has turned in order to determine the next behavior of the AV 100.

In some embodiments, the traffic light 1404 can have more than one traffic signal active at the same time, for example, a red left turn arrow and a green light. The circuit 1320 determines a configuration of the traffic light 1404 based on sensor data (for example, the digital video streams 1308a, 1308b). The configuration includes multiple traffic signals (from multiple lights or multiple bulbs of the traffic light 1404). Each light or bulb is typically one traffic signal (e.g., a red light or a green left turn arrow). The configuration of the traffic light 1404 controls which lane each light or bulb is associated with based on the lane markings 1464. In some embodiments, the circuit 1320 first detects the lane markings 1464, detects the one or more traffic signals, and then associates each traffic signal to a lane.

The circuit 1320 associates one or more traffic signals of the multiple traffic signals with the lane 1428 that the AV 100 is operating in. The circuit 1320 associates the one or more traffic signals based on a digital video stream of lane markings 1464 of the lane 1428. The digital video stream of the lane markings 1464 can be generated by the cameras 1306a, 1306b, the monocular or stereo video cameras 122 in the visible light, infrared or thermal (or both) spectra, and/or the LiDAR 123. The one or more traffic signals include the traffic signal 1310.

Consider a scenario in which the AV 100 is stopped at the intersection 1440. The circuit 1320 detects that the traffic signal 1456 at the intersection 1440 is a flashing yellow light based on the sensor data. The sensor data includes the digital video streams 1308a, 1308b. The planning module 404 determines an amount of time to pause prior to operating through the intersection 1440 based on a speed of another vehicle 1472 approaching the intersection 1440. The vehicle 1472 is approaching the intersection 1440 in a third direction perpendicular to a second direction in which the AV 100 is operating. The planning module of the AV 100 determines an amount of time to pause at the intersection 1440 before proceeding based on a distance D4 between the vehicle 1472 and the intersection 1440 and the speed of the vehicle 1472 approaching the intersection 1440 laterally.

Consider a scenario in which the AV 100 is stopped at the intersection 1440. The traffic signal 1456 is a red light. The circuit 1320 detects that the traffic signal 1456 has transitioned from a red light to a green light based on the digital video streams 1308a, 1308b. The perception module 402 detects that another vehicle 193 is stopped within the intersection 1440 based on sensor data generated by the monocular or stereo video cameras 122 in the visible light, infrared or thermal (or both) spectra, and/or the LiDAR 123. Responsive to detecting that the other vehicle 193 is stopped within the intersection 1440, the control circuit 406 pauses the AV 100 at the intersection 1440.

In an embodiment, the planning module 404 determines that the AV 100 will be unable to cross the intersection 1440 prior to the traffic signal 1456 transitioning to a red light based on the digital video streams 1308a, 1308b. Responsive to determining that the AV 100 will be unable to cross the intersection 1440, the control circuit 406 pauses the AV 100 at the intersection 1440. For example, the AV 100 detects that the traffic signal 1456 is a red light that is transitioning to a green light. The AV 100 will not enter the intersection 1440 even when the traffic signal 1456 is a green light, unless there is enough space to cross the intersection 1440 completely before the traffic signal 1456 turns a red light again (to avoid blocking the intersection 1440 in the presence of heavy traffic).

Figure 15:
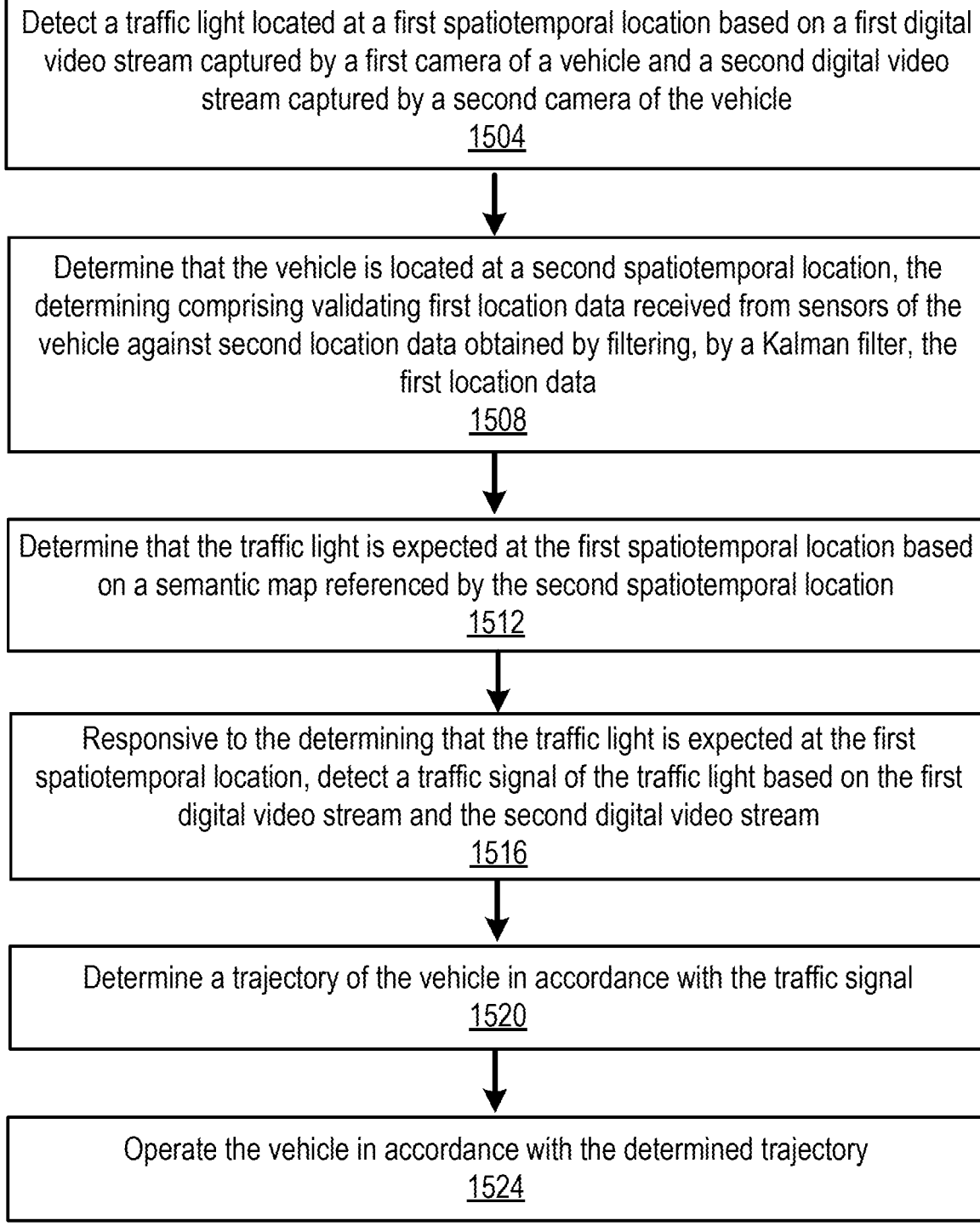
FIG. 15 is a flow diagram illustrating a process for operation of a TLD system for a vehicle, in accordance with one or more embodiments.

FIG. 15 is a flow diagram illustrating a process for operation of the AV 100. The AV 100 is illustrated and described in more detail with reference to FIG. 1. In one embodiment, the process of FIG. 15 is performed by the TLD system 1300, illustrated and described in more detail with reference to FIG. 13. Other entities, for example, one or more components of the AV 100 perform some or all of the steps of the process in other embodiments. Likewise, embodiments may include different and/or additional steps, or perform the steps in different orders.

The AV 100 detects 1504 a traffic light 1404 located at a location 1408. The traffic light 1404 and location 1408 are illustrated and described in more detail with reference to FIG. 14. The traffic light 1404 is detected based on a digital video stream 1308a captured by a camera 1306a of the AV 100 and a digital video stream 1308b captured by a camera 1306b of the AV 100. The digital video streams 1308a, 1308b and cameras 1306a, 1306b are illustrated and described in more detail with reference to FIG. 13.

The AV 100 determines 1508 that the AV 100 is located at a spatiotemporal location 1412. The spatiotemporal location 1412 is illustrated and described in more detail with reference to FIG. 14. To determine the spatiotemporal location 1412, the AV 100 validates the location data 1366a generated using the RADARs 1374, the location data 1366b generated using the LiDARs 1376, and/or the location data 1394 generated using the GNSS receivers 1370 against location data 1368 generated by the localization circuit 1364. The RADARs 1374, LiDARs 1376, GNSS receivers 1370, and localization circuit 1364 are illustrated and described in more detail with reference to FIG. 13. For example, the location data 1366a, 1366b, 1394 is generated or obtained by filtering the first location data using the second filter in the localization circuit 1364.

The AV 100 determines 1512 that the traffic light 1404 is expected at the location 1408 based on a semantic map 1342 referenced by the spatiotemporal location 1412. The semantic map 1342 is stored by the mapping module 1340. The circuits 1348a, 1322 use the determined spatiotemporal location 1412 of the AV 100 to reference the semantic map 1342. The semantic map 1342, mapping module 1340, and circuits 1348a, 1322 are illustrated and described in FIG. 13.

Responsive to determining that the traffic light 1404 is indeed expected at the location 1408, the AV 100 detects 1516 a traffic signal 1310 of the traffic light 1404 based on the digital video streams 1308a, 1308b. To detect the traffic signal 1310, the circuit 1324a segments at least one image frame of the digital video stream 1308a. The circuit 1324a is illustrated and described in FIG. 13. The circuit 1324a uses edge detection to detect an area of the at least one image frame corresponding to the traffic signal 1310. For example, a rectangular frame of the traffic light 1404 contains three or more circular or square lights. The circuit 1324a segments the rectangular area within the frame to isolate the lights. Similarly, the circuit 1324b processes the digital video stream 1308b to segment the rectangular area within the frame of the traffic light 1404 to detect the traffic signal 1310.

The AV 100 determines 1520 a trajectory 198 of the AV 100 in accordance with the traffic signal 1310. Prior to detecting the traffic signal 1310, the circuit 1320 predicts that the traffic signal 1310 is a red light for determining the trajectory 198 of the AV 100. That is, the AV 100 assumes that the state of the traffic light 1404 is a red light whenever the state is unknown or has not been detected yet.

The control circuit 406 operates 1524 the AV 100 in accordance with the determined trajectory 198. In some embodiments, responsive to detecting the traffic light 1404, the AV 100 uses the control circuit 406 or the perception module 1304 to adjust an orientation of at least one of the cameras 1306a, 1306b to point the cameras 1306a, 1306b at the traffic light 1404 while the AV 100 is moving towards the traffic light 1404. As the AV 100 moves, the cameras 1306a, 1306b angle upwards or sideways towards the traffic light 1404 as the AV 100 approaches the traffic light 1404 for better image capture.

Figure 16:
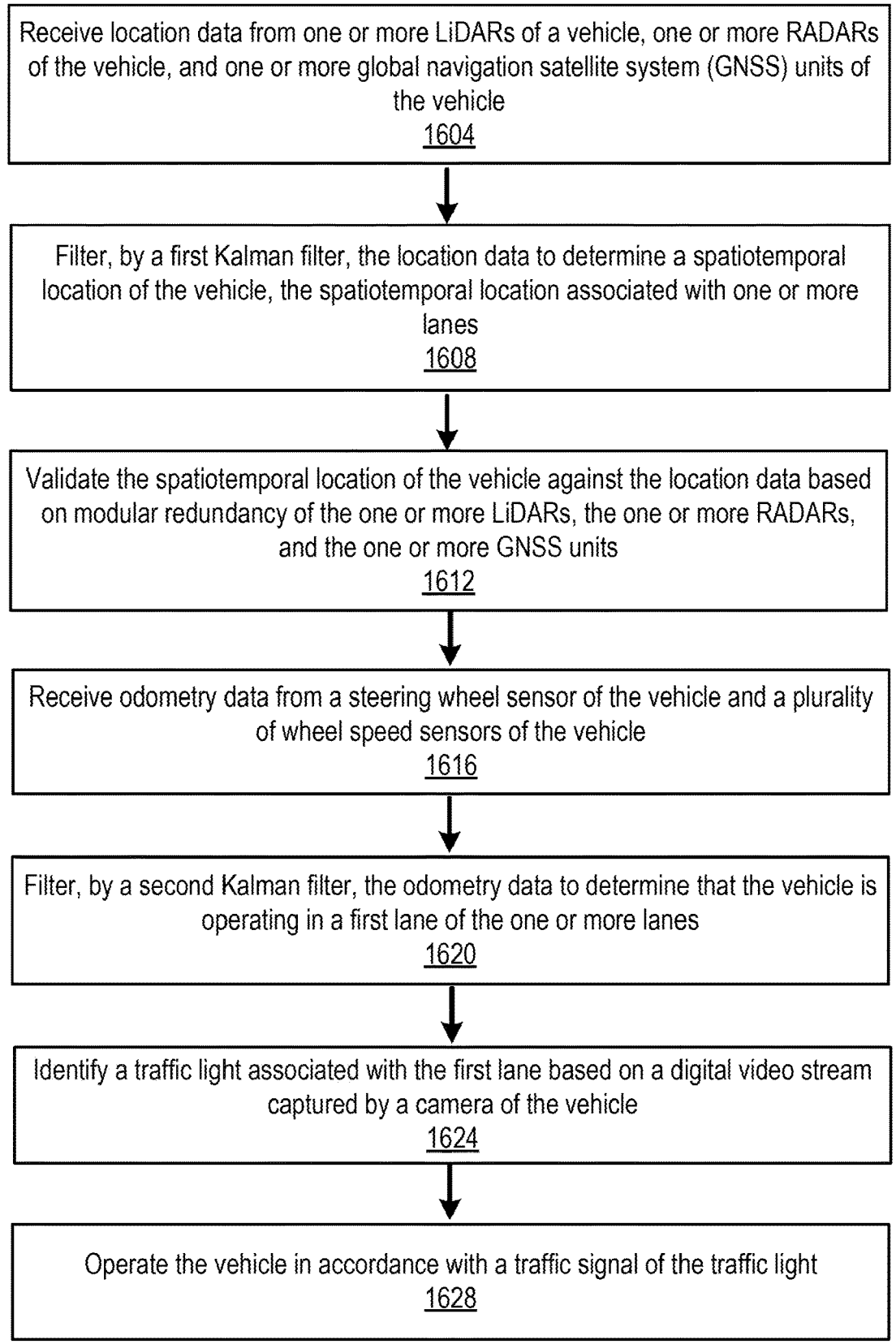
FIG. 16 is a flow diagram illustrating a process for operation of the TLD system for a vehicle, in accordance with one or more embodiments.

FIG. 16 is a flow diagram illustrating a process for operation of the AV 100 for the AV 100. In one embodiment, the process of FIG. 16 is performed by the TLD system 1300. Other entities, for example, one or more components of the AV 100 perform some or all of the steps of the process in other embodiments. Likewise, embodiments may include different and/or additional steps, or perform the steps in different orders.

The AV 100 receives 1604 location data 1366a generated using the RADARs 1374, the location data 1366b generated using the LiDARs 1376, and/or the location data 1394 generated using the GNSS receivers 1370 of the AV 100. The RADARs 1374, LiDARs 1376, GNSS receivers 1370, and localization circuit 1364 are illustrated and described in more detail with reference to FIG. 13. The localization circuit 1362 validates the location data 1366a generated using the RADARs 1374, the location data 1366b generated using the LiDARs 1376, and/or the location data 1394 generated using the GNSS receivers 1370 against location data 1368 generated by the localization circuit 1364.

The AV 100 filters 1608 the location data 1366a, 1366b, 1394 using a first filter (e.g., a Bayesian filter, a Kalman filter, etc.) executed by the localization circuit 1362 to determine the spatiotemporal location 1412 of the AV 100. The spatiotemporal location 1412 is associated with one or more lanes, for example, lanes 1428, 1432 illustrated in FIG. 14.

The AV 100 validates 1612 the spatiotemporal location 1412 of the AV 100 against the location data 1366a, 1366b, 1394 based on modular redundancy of the LiDARs 1374, RADARs 1376, and GNSS receivers 1370. For example, triple-modular redundancy is used. Upon detecting a localization fault, the localization circuit 1362 notifies the planning module 404, which initiates a safe stop maneuver in accordance with a comfort profile.

The AV 100 receives 1616 odometry data 1388 from a steering wheel sensor 1384 and multiple wheel sensors 1382 of the AV 100. The steering wheel sensor 1384 generates data, such as a steering wheel angle and an angular velocity. The multiple wheel sensors 1382 generate data, such an angle and speed of the wheels. Additional detail on wheel speed sensors is presented with reference to FIG. 1. The odometry unit 1386 generates the odometry data 1388 based on the data from the steering wheel sensor 1384 and wheel sensors 1382. In some embodiments, the IMU 1372 generates data, such as measuring inertia, pitch, yaw, roll, or vehicle backup detection (or rolling backwards). The data from the IMU 1372 is validated against the data 1396c by the validation circuit 1390.

The AV 100 filters 1620 the odometry data 1388 using a second filter (e.g., a Bayesian filter, a Kalman filter, etc.) executed by the localization circuit 1364. The filtering is performed to determine that the AV 100 is operating in the lane 1428 of the one or more lanes 1428, 1432. To localize the AV 100 in the particular lane 1428, the lane 1428 can also be associated with the traffic light 1404 using the semantic map 1342. For example, to determine that the AV 100 is operating in the particular lane 1428, the localization circuit 1364 references the semantic map 1342. The semantic map 1342 represents a drivable area including the one or more lanes 1428, 1432. The localization circuit 1364 uses the odometry data 1388 filtered by the second filter to reference the semantic map 1342.

The AV 100 identifies 1624 the traffic light 1404 associated with the lane 1428 based on the digital video streams 1308a, 1308b captured by the cameras 1306a, 1306b of the AV 100. In some embodiments, the circuit 1320 validates the traffic light detection using modular redundancy of the cameras 1306a, 1306b and the DSRC sensor 1316.

The control circuit 406 of the AV 100 operates the AV 100 in accordance with the traffic signal 1310 of the traffic light 1404. The perception module 1300 uses N-modular redundancy to detect the traffic signal 1310. In some embodiments, N is 3. In other embodiments, N can be 4, 5, 6, etc., depending on the number of cameras. For example, to detect the traffic signal 1310, the circuits 1324a, 1320 detect that the traffic signal 1310 is a first color (for example, green) based on the digital video stream 1308a from the camera 1306a. The circuits 1324b, 1320 detect that the traffic signal 1310 is a second color (for example, red) based on the digital video stream 1308b from the camera 1306b. The circuits 1324c, 1320 detect that the traffic signal 1310 is a third color (for example, red) based on the DSRC message 1318 received by the DSRC sensor 1316 of the AV 100. Responsive to detecting that the third color (red) is the same as the second color, the circuit 1320 associates the traffic signal 1310 with the second color (red).

FIG. 17 is a flow diagram illustrating a process for operation of the AV 100 for the AV 100, in accordance with one or more embodiments. In one embodiment, the process of FIG. 17 is performed by the TLD system 1300 for. Other entities, for example, one or more components of the AV 100 perform some or all of the steps of the process in other embodiments. Likewise, embodiments may include different and/or additional steps, or perform the steps in different orders.

The AV 100 detects 1704 that a traffic signal 1310 of a traffic light has transitioned from a green light to a yellow light based on the digital video streams 1308a, 1308b captured by the cameras 1306a, 1306b of the AV 100. Prior to detecting that the traffic signal 1310 has transitioned from a green light to a yellow light, the circuit 1320 associates the traffic signal 1310 with a red light (as a worst case, safety mechanism).

The AV 100 validates 1708 that the traffic signal 1310 is a yellow light, based on a DSRC message 1318 received by a DSRC sensor 1316 of the AV 100. The DSRC message 1318 is transmitted by a DSRC transmitter of the traffic light 1404 and can be processed by the circuit 1324c. For example, the circuit 1320 associates the traffic signal 1310 with a red light until determined with a high level of confidence otherwise. Further, if the digital video streams 1308a, 1308b are ambiguous or diagnostic failures occur, the TLD system 1300 continues to associate the traffic signal 1310 with a red light.

The current time is denoted by T1. The AV 100 determines 1712 that the traffic signal 1310 will transition to a red light in a particular amount of time T2 based on the digital video streams 1308a, 1308b. The circuit 1320 determines an elapsed time T4 after the traffic signal 1310 transitioned to a yellow light. Based on the elapsed time T4, the circuit 1320 determines the particular amount of time T2.

The AV 100 determines 1716 that the AV 100 is located at a particular distance D1 from the stop line 1452 of the traffic light 1404 based on the digital video streams 1308a, 1308b and the location 1412 of the AV 100. Based on the DSRC message 1318, the circuit 1320 determines the location 1408 of the traffic light 1404. The TLD system 1300 validates the particular amount of time T2 against the semantic map 1342. The TLD system 1300 references the semantic map 1342 by the location 1408 of the traffic light 1404. For example, the semantic data from the semantic map 1342 can validate how long the traffic signal 1310 takes to change.

The AV 100 determines that the AV 100 is able to stop at the stop line 1452 within the particular amount of time T2 in accordance with a comfort profile. The planning module 404 makes the determination based on the particular amount of time T2 and the particular distance D1 from the stop line. The planning module 404 determines an amount of deceleration to be applied to the AV 100 to stop the AV 100 at the stop line 1452 within the particular amount of time T2 in accordance with the comfort profile.

The control circuit 406 of the AV 100 stops the AV 100 at the stop line 1452 within the particular amount of time T2 in accordance with the comfort profile. In some scenarios, there can be another vehicle 193 ahead the AV 100. The planning module 404 determines a distance D2 between the AV 100 and the other vehicle 193 ahead of the AV 100. The planning module 404 determines amount of deceleration to be applied to the AV 100 to stop the AV 100 based on the distance D2 between the AV 100 and the other vehicle 193.

Figure 18:
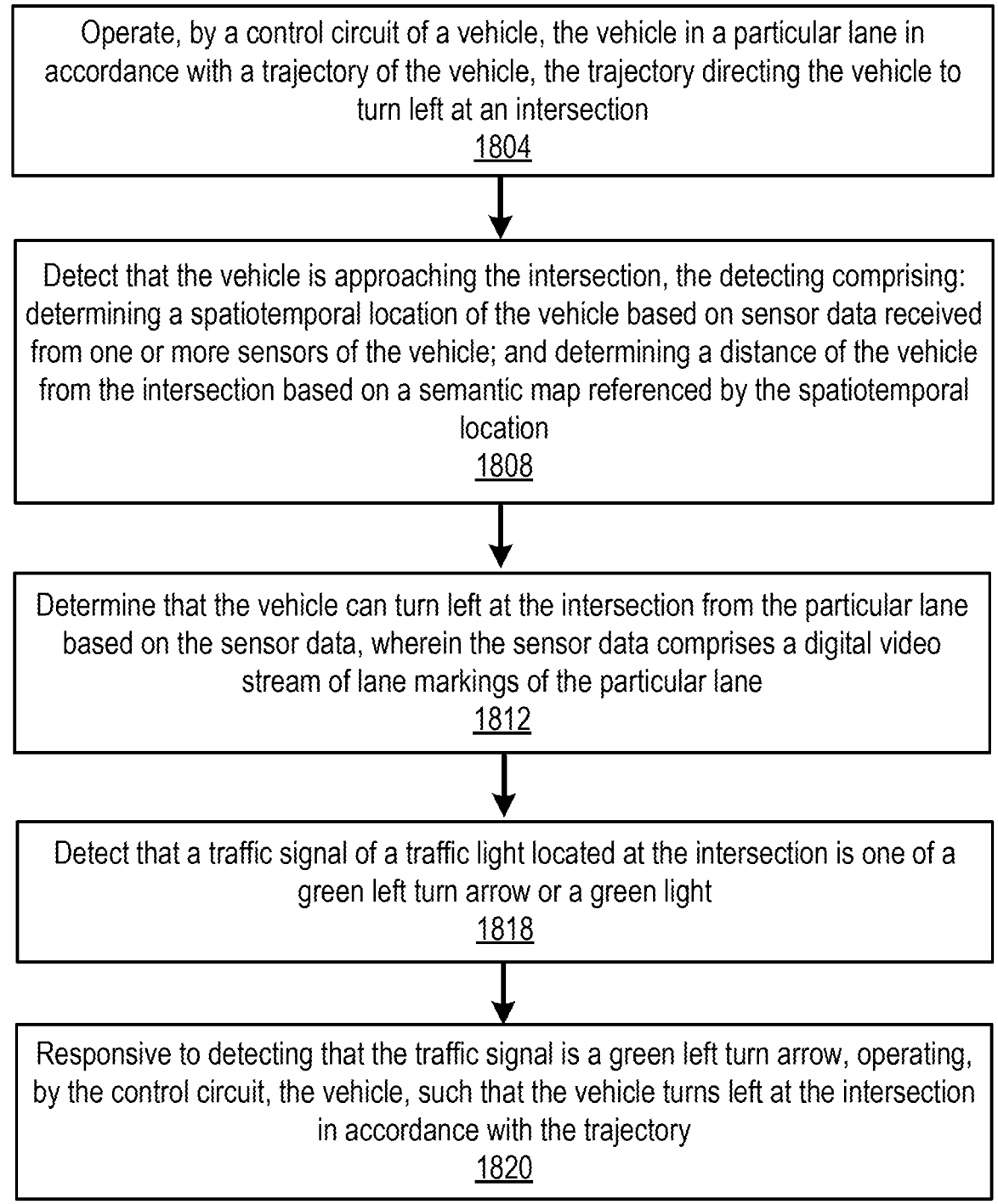
FIG. 18 is a flow diagram illustrating a process for operation of the TLD system for a vehicle, in accordance with one or more embodiments.

FIG. 18 is a flow diagram illustrating a process for operation of the AV 100, in accordance with one or more embodiments. Other entities, for example, one or more components of the TLD system 1300 perform one or more of the steps of the process in other embodiments. Likewise, embodiments may include different and/or additional steps, or perform the steps in different orders.

The AV 100 operates 1804 the AV 100 in a particular lane 1428 in accordance with a trajectory 198 of the AV 100. The trajectory 198 is directing the AV 100 to turn left at an intersection 1416. The AV 100, lane 1428, and intersection 1416 are illustrated in FIG. 14. The localization module 1360 detects that the AV 100 is approaching the intersection 1416. For example, the possible traffic signal configurations of the traffic signal 1310 of the traffic light 1404 are a blinking red light, a blinking yellow light, a green light and a red left turn arrow, etc.

The AV 100 detects 1808 that the AV 100 is approaching the intersection 1416. To perform the detection, the AV 100 determines the spatiotemporal location 1412 of the AV 100 based on sensor data received from one or more sensors of the AV 100. For example, the sensor data includes the GNSS data 1396c, the RADAR data 1396a, and/or the LIDAR data 1396b. In some embodiments, the localization module 1362 validates filtered sensor data against the sensor data to provide the spatiotemporal location 1412. The sensor data can also be validated against the digital video streams 1308a, 1308b by the circuit 1322. The RADARs 1374, LiDARs 1376, GNSS receivers 1370, and localization circuit 1364 are illustrated and described in more detail with reference to FIG. 13.

The AV 100 determines 1812 a distance D2 of the AV 100 from the intersection 1416 using the semantic map 1342 referenced by the spatiotemporal location 1412. For example, the semantic map 1342 is included in the TLD system 1300 to facilitate relational awareness of the following: (1) relating the AV 100 to a lane (e.g., lane 1428); (2) relating the lane 1428 to an intersection (e.g., intersection 1416) using the trajectory 198 from the planning module 404; (3) relating the lane 1428 and intersection 1416 to a traffic light (e.g., traffic light 1404); and (4) relating the AV 100 to a stop line (e.g., the stop line 1452).

The AV 100 determines 1816 that the AV 100 can turn left at the intersection 1416 from the lane 1428 based on sensor data from the cameras 1306a, 1306b and other sensors described in this specification. For example, the sensor data includes digital video streams of lane markings 1464 of the lane 1428. The TLD system 1300 detects that the traffic signal 1310 of the traffic light 1404 located at the intersection 1416 is either a green left turn arrow or a green light. The TLD system 1300 is implemented to "fail safe."

The AV 100 determines 1820 that the traffic signal 1310 of the traffic light 1404 located at the intersection 1416 is either a green left turn arrow or a green light. Responsive to detecting that the traffic signal 1310 is a green light, the perception module 402 can detect that another vehicle 1424 is approaching the intersection 1416 in a first direction opposite to a second direction in which the AV 100 is operating. The perception module 402 and planning module 404 determine that the AV 100 is able to turn left in accordance with a comfort profile before the other vehicle 1424 reaches the intersection 1416.

Responsive to determining that the traffic signal 1310 is a green left turn arrow, the control circuit 406 operates the AV 100, such that the AV 100 turns left at the intersection 1416 in accordance with the trajectory 198.

Additional Embodiments

In an embodiment, the methods and implementations disclosed herein are used to detect and analyze traffic signals located at railroad crossings, light signals emitted by emergency vehicles, illuminated signals on drawbridge crossings, road hazard or condition signs with flashing yellow lights, and school buses with flashing lights.

In an embodiment, the methods and implementations disclosed herein are used to detect and analyze light signals that indicate a sharp turn, a steep upgrade, or a road condition. For example, such signals can be flashing yellow for caution.

In an embodiment, map data is used to determine if a railroad crossing or drawbridge crossing is flashing red.

In an embodiment, LiDAR data is used to detect a school bus, an emergency vehicle, or a police car in combination with detection of its flashing lights.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further including," in the foregoing description or following claims, what follows this phrase can be an additional step or entity, or a sub-step/sub-entity of a previously-recited step or entity.

What is claimed is:

1. A method comprising:
    detecting, by one or more processors of a vehicle, a traffic light located at a first spatiotemporal location based on a first digital video stream captured by a first camera of the vehicle and a second digital video stream captured by a second camera of the vehicle;
    determining, by the one or more processors, that the vehicle is located at a second spatiotemporal location, the determining comprising validating, by the one or more processors, first location data obtained from a plurality of sensors of the vehicle against second location data obtained by filtering, by a filter, the first location data;
    determining, by the one or more processors, that the traffic light is expected at the first spatiotemporal location based on a semantic map referenced by the second spatiotemporal location;
    responsive to determining that the traffic light is expected at the first spatiotemporal location, detecting, by the one or more processors, a traffic signal of the traffic light based on the first digital video stream and the second digital video stream, wherein detecting the traffic signal comprises:
        extracting, by the one or more processors, a feature vector from the first digital video stream and the second digital video stream; and
        determining, based on a machine learning model executed by the one or more processors, the traffic signal based on the feature vector, the machine learning model trained to recognize a color of an object based on features extracted from digital video streams of the object, wherein the machine learning model comprises a first artificial neural network trained to recognize red lights and a second artificial neural network trained to recognize green lights, the first artificial neural network independent of the second artificial neural network;
    determining, by the one or more processors, a trajectory of the vehicle in accordance with the traffic signal; and
    causing the vehicle to operate in accordance with the determined trajectory.

2. The method of claim 1, wherein the first camera is located at a first position on the vehicle, and the second camera is located at a second position on the vehicle to increase an accuracy in the detecting of the traffic light based on redundancy of the first digital video stream and the second digital video stream.

3. The method of claim 1, further comprising validating, by the one or more processors, the traffic signal based on a dedicated short range communication (DSRC) message received by a DSRC sensor of the vehicle from the traffic light.

4. The method of claim 1, further comprising validating, by the one or more processors, that the traffic light is located at the first spatiotemporal location based on a DSRC message received by a DSRC sensor of the vehicle from the traffic light.

5. The method of claim 1, further comprising validating, by the one or more processors, that the vehicle is located at the second spatiotemporal location based on the semantic map referenced by the first spatiotemporal location.

6. The method of claim 1, further comprising:
prior to the detecting of the traffic signal, predicting, by the one or more processors, that the traffic signal is a red light for determining the trajectory of the vehicle.

7. The method of claim 1, further comprising:
detecting, by the one or more processors, a failure to detect a second traffic signal of a second traffic light; and
responsive to detecting the failure, associating, by the one or more processors, the second traffic signal with a red light.

8. The method of claim 1, wherein detecting the traffic signal comprises segmenting, by the one or more processors, at least one image frame of the first digital video stream and the second digital video stream to detect an area of the at least one image frame corresponding to the traffic signal.

9. The method of claim 1, further comprising receiving, by a DSRC sensor of the vehicle, a DSRC message from the traffic light indicating that the traffic signal will change at a particular time.

10. The method of claim 1, further comprising:
responsive to detecting the traffic light, adjusting, by the one or more processors, an orientation of at least one of the first camera or the second camera to point the at least one of the first camera or the second camera at the traffic light while the vehicle is moving.

11. The method of claim 1, wherein the plurality of sensors of the vehicle comprises one or more global navigation satellite system (GNSS) receivers, one or more RADAR sensors, and one or more LiDARs.

12. The method of claim 1, wherein detecting the traffic signal comprises:
determining, by the one or more processors, that the traffic signal is a first color based on the first digital video stream;
determining, by the one or more processors, that the traffic signal is a second color based on the second digital video stream;
determining, by the one or more processors, that the traffic signal is the second color based on a DSRC message received by a DSRC sensor of the vehicle; and
associating, by the one or more processors, the traffic signal with the second color.

13. The method of claim 1, further comprising training, by the one or more processors, the machine learning model to recognize traffic signals of traffic lights based on feature vectors extracted from digital video streams of the traffic lights.

14. The method of claim 1, further comprising:
determining, by the one or more processors, that the traffic signal is a green light;
determining, by the one or more processors, that an object is moving proximate to the first spatiotemporal location based on the first digital video stream and the second digital video stream; and
causing a speed of the vehicle to decrease to avoid a collision of the vehicle with the object.

15. The method of claim 1, further comprising:
determining, by the one or more processors, that the traffic light is non-operational due to a power outage; and
causing the vehicle to stop.

16. The method of claim 1, further comprising:
determining, by the one or more processors, absence of an object proximate to the first spatiotemporal location, the object being different from the traffic light; and
transmitting, by the one or more processors, a message to cause the vehicle to operate in accordance with the determined trajectory.

17. A vehicle comprising:
one or more computer processors; and
one or more non-transitory storage media storing instructions which, when executed by the one or more computer processors, cause the one or more computer processors to:
detect a traffic light located at a first spatiotemporal location based on a first digital video stream captured by a first camera of the vehicle and a second digital video stream captured by a second camera of the vehicle;
determine that the vehicle is located at a second spatiotemporal location, the determining comprising validating, by the one or more processors, first location data obtained from a plurality of sensors of the vehicle against second location data obtained by filtering, by a filter, the first location data;
determine that the traffic light is expected at the first spatiotemporal location based on a semantic map referenced by the second spatiotemporal location;
responsive to determining that the traffic light is expected at the first spatiotemporal location, detect a traffic signal of the traffic light based on the first digital video stream and the second digital video stream, wherein to detect the traffic signal, the one or more computer processors are caused to:
extract a feature vector from the first digital video stream and the second digital video stream; and
execute a machine learning model to determine the traffic signal based on the feature vector, the machine learning model trained to recognize a color of an object based on features extracted from digital video streams of the object, wherein the machine learning model comprises a first artificial neural network trained to recognize red lights and a second artificial neural network trained to recognize green lights, the first artificial neural network independent of the second artificial neural network;
determine a trajectory of the vehicle in accordance with the traffic signal; and
cause the vehicle to operate in accordance with the determined trajectory.

18. One or more non-transitory storage media storing instructions which, when executed by one or more computing devices, cause the one or more computing devices to:
detect a traffic light located at a first spatiotemporal location based on a first digital video stream captured by a first camera of a vehicle and a second digital video stream captured by a second camera of the vehicle;
determine that the vehicle is located at a second spatiotemporal location, the determining comprising validating first location data obtained from a plurality of sensors of the vehicle against second location data obtained by filtering, by a filter, the first location data;

determine that the traffic light is expected at the first spatiotemporal location based on a semantic map referenced by the second spatiotemporal location;

responsive to determining that the traffic light is expected at the first spatiotemporal location, detect a traffic signal of the traffic light based on the first digital video stream and the second digital video stream, wherein to detect the traffic signal, the one or more computing devices are caused to:

extract a feature vector from the first digital video stream and the second digital video stream; and execute a machine learning model to determine the traffic signal based on the feature vector, the machine learning model trained to recognize a color of an object based on features extracted from digital video streams of the object, wherein the machine learning model comprises a first artificial neural network trained to recognize red lights and a second artificial neural network trained to recognize green lights, the first artificial neural network independent of the second artificial neural network;

determine a trajectory of the vehicle in accordance with the traffic signal; and cause the vehicle to operate in accordance with the determined trajectory.

* * * * *